United States Patent [19]

Kinugasa et al.

[11] Patent Number: 5,740,669
[45] Date of Patent: Apr. 21, 1998

[54] EXHAUST GAS PURIFICATION DEVICE FOR AN ENGINE

[75] Inventors: Yukio Kinugasa; Kouhei Igarashi, both of Susono; Takaaki Itou, Mishima; Toshifumi Takaoka, Susono, all of Japan

[73] Assignee: Toyota Jidosha Kabushiki Kaisha, Aichi, Japan

[21] Appl. No.: 559,107

[22] Filed: Nov. 16, 1995

[30] Foreign Application Priority Data

Nov. 25, 1994 [JP] Japan .................... 6-291662
Oct. 11, 1995 [JP] Japan .................... 7-263019

[51] Int. Cl.$^6$ .......................................... F01N 3/28
[52] U.S. Cl. ...................... 60/285; 60/286; 60/298; 60/301
[58] Field of Search ................... 60/274, 286, 301, 60/285, 298

[56] References Cited

U.S. PATENT DOCUMENTS

| | | | |
|---|---|---|---|
| 3,819,334 | 6/1974 | Yoshida | 60/299 |
| 5,357,749 | 10/1994 | Ohsuga | 60/301 |
| 5,402,641 | 4/1995 | Katoh | 60/301 |
| 5,437,153 | 8/1995 | Takeshima | 60/301 |
| 5,461,857 | 10/1995 | Itou | 60/276 |

FOREIGN PATENT DOCUMENTS

| | | |
|---|---|---|
| 610725 | 1/1994 | Japan . |
| 6108834 | 4/1994 | Japan . |
| 693842 | 4/1994 | Japan . |
| 6129235 | 5/1994 | Japan . |
| WO9307363 | 4/1993 | WIPO . |

*Primary Examiner*—Douglas Hart
*Attorney, Agent, or Firm*—Kenyon & Kenyon

[57] ABSTRACT

In the present invention, a $NO_x$ absorbent is used for removing the $NO_x$ in the exhaust gas. The $NO_x$ absorbent absorbs $NO_x$ in the exhaust gas when the air-fuel ratio of the exhaust gas is lean, and releases the absorbed $NO_x$ and reduces it to nitrogen when the air-fuel ratio of the exhaust gas is rich or stoichiometric. To prevent the $NO_x$ absorbent from being saturated with the absorbed $NO_x$, the $NO_x$ absorbent must be regenerated periodically by causing the $NO_x$ in the absorbent to be released and reduced. However, it is found that when the regenerating process by supplying a rich air-fuel ratio exhaust gas to the $NO_x$ absorbent is carried out at high $NO_x$ absorbent temperature, a part of $NO_x$ flows out from the $NO_x$ absorbent at the beginning of the regenerating process without being reduced. In the present invention, this outflow of $NO_x$ is suppressed by, for example, carrying out the regenerating process only when the temperature of the $NO_x$ absorbent is lowered to a predetermined temperature. This predetermined temperature is set low enough to ensure that the amount of the outflow of $NO_x$ is minimized.

5 Claims, 12 Drawing Sheets

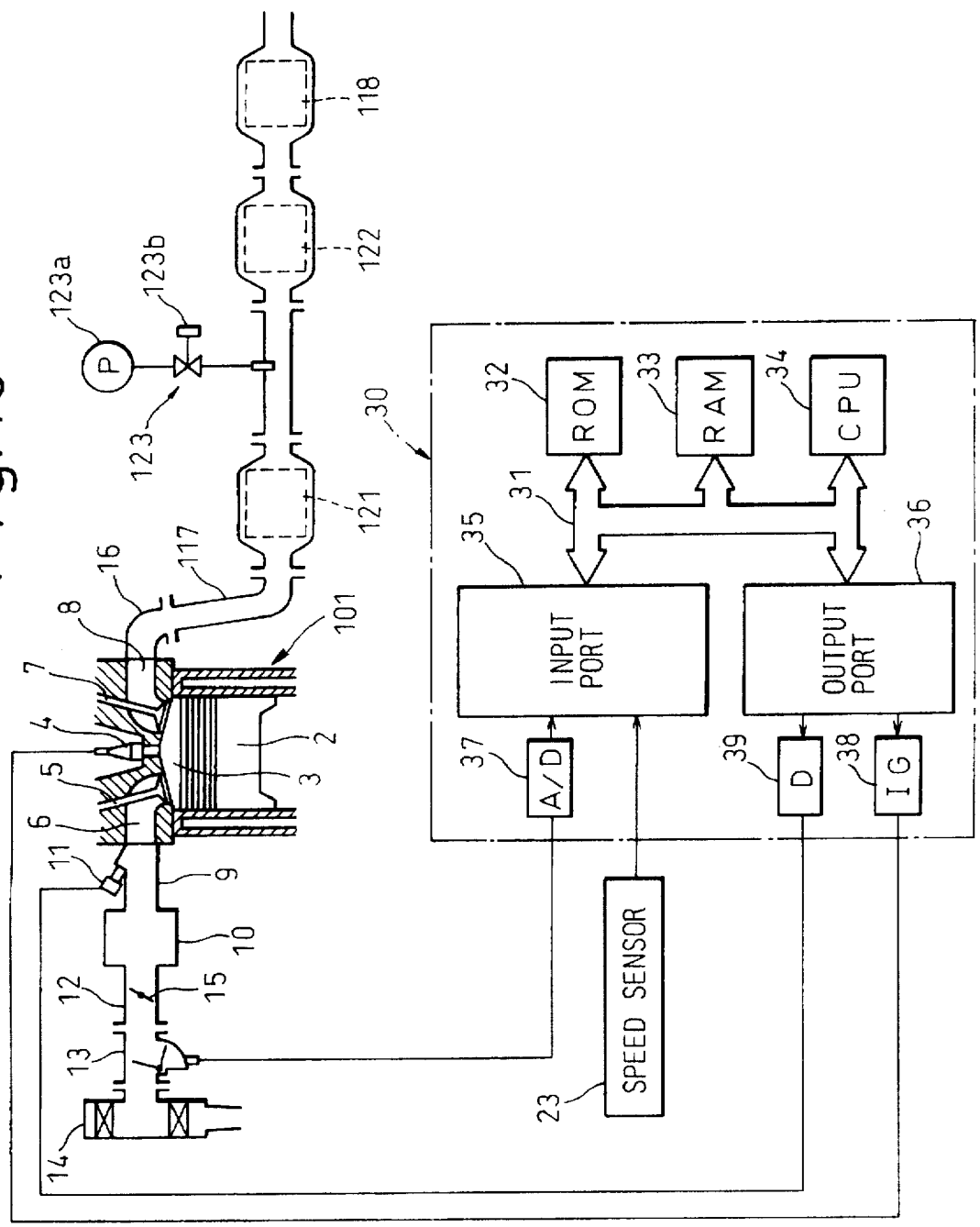

5,740,669

EXHAUST GAS PURIFICATION DEVICE FOR AN ENGINE

BACKGROUND OF THE INVENTION

1. Field of the Invention

The present invention relates to an exhaust gas purification device for an engine. More specifically, the present invention relates to a device which is capable of effectively preventing $NO_x$ components in the exhaust gas of the engine from being discharged into the atmosphere.

2. Description of the Related Art

WO 93-07363 discloses an exhaust gas purification device which is capable of removing $NO_x$ components in the exhaust gas of a lean burn engine (i.e., an internal combustion engine mainly operated at an air-fuel ratio higher than the stoichiometric air-fuel ratio). In the device in WO 93-07363, a $NO_x$ absorbent which absorbs $NO_x$ components in the exhaust gas when the air-fuel ratio of the exhaust gas is lean and releases the absorbed $NO_x$ when the oxygen concentration in the exhaust gas becomes low is disposed in the exhaust passage of the engine. As the air-fuel ratio of exhaust gas produced through most of the operating range of lean burn engines is lean, $NO_x$ components are normally removed from the exhaust gas by being absorbed into the $NO_x$ absorbent. In the device in WO 93-07363, the air-fuel ratio of the engine is lowered to make the air-fuel ratio of the exhaust gas rich or stoichiometric when the amount of the $NO_x$ absorbed and accumulated in the $NO_x$ absorbent increases. When the air-fuel ratio of the exhaust gas becomes rich or stoichiometric, the oxygen concentration in the exhaust gas falls rapidly and, at the same time, the concentration of HC (hydrocarbons) and CO (carbon monoxide) components in the exhaust gas becomes high. Therefore, $NO_x$ accumulated in the $NO_x$ absorbent is released from the absorbent and reduced to $N_2$ by the HC, CO components in the exhaust gas. This process for causing the release of the absorbed $NO_x$ from the $NO_x$ absorbent and reducing the released $NO_x$ is called "a regenerating process for the $NO_x$ absorbent".

In the device in WO 93-07363, the $NO_x$ components are removed from the exhaust gas by repeating the absorbing process and the regenerating process alternately during the engine operation.

However, in the device disclosed in WO 93-07363, it was found that a relatively large amount of $NO_x$ flows out from the $NO_x$ absorbent at the beginning of the regenerating process. As explained above, all the $NO_x$ components discharged from the $NO_x$ absorbent react with HC and CO components in the exhaust gas and are reduced to nitrogen during the regenerating process. Therefore, it was considered that no $NO_x$ components flow out from the $NO_x$ absorbent during the regenerating process. But, actually, when the operating air-fuel ratio of the engine shifts to rich or stoichiometric air-fuel ratio, the concentration of $NO_x$ components in the exhaust gas flowing out from the $NO_x$ absorbent temporarily increases.

The reason why the $NO_x$ components are discharged from the $NO_x$ absorbent without being reduced at the beginning of the regenerating process is not clear at present but there is a possibility that a continuous change in the air-fuel ratio within the $NO_x$ absorbent causes this phenomena. Even though the air-fuel ratio of the exhaust gas flowing into the $NO_x$ absorbent changes from a lean air-fuel ratio to a rich air-fuel ratio in a very short time, the air-fuel ratio of the exhaust gas within the $NO_x$ absorbent does not change instantly. In this case, the air-fuel ratio within the $NO_x$ absorbent changes from lean air-fuel ratio to rich air-fuel ratio continuously and passes an intermediate air-fuel ratio region. In this intermediate air-fuel ratio region, it is considered that the concentration of the oxygen is low enough to cause the releasing of $NO_x$ from the $NO_x$ absorbent, but the concentration of HC and CO components in the exhaust gas is not sufficiently high to reduce all the $NO_x$ released from the $NO_x$ absorbent (or the concentration of the oxygen is still not sufficiently low to cause a reducing reaction). Therefore, a portion of the $NO_x$ released from the $NO_x$ absorbent flows out from the $NO_x$ absorbent without being reduced.

Even in this case, the air-fuel ratio within the $NO_x$ absorbent becomes sufficiently rich to reduce all the $NO_x$ released from the $NO_x$ absorbent when a certain time lapses after the regenerating process starts and the outflow of $NO_x$ components terminates. However, since the outflow of $NO_x$ occurs every time the regenerating process starts, this causes an increase in the total emission of $NO_x$.

SUMMARY OF THE INVENTION

Therefore, in view of the problem explained above, the object of the present invention is to provide an exhaust gas purification device which is capable of preventing the outflow of $NO_x$ at the beginning of the regenerating process of the $NO_x$ absorbent.

According to one aspect of the present invention, there is provided an exhaust gas purification device for an internal combustion engine comprising a $NO_x$ absorbent disposed in an exhaust passage of an internal combustion engine, the $NO_x$ absorbent absorbing $NO_x$ components in the exhaust gas of the engine when the air-fuel ratio of the exhaust gas flowing into the $NO_x$ absorbent is lean, and releasing the absorbed $NO_x$ components when the oxygen concentration in the exhaust gas becomes lower, temperature detecting means for detecting the temperature of the $NO_x$ absorbent, regenerating means for causing the air-fuel ratio of the exhaust gas flowing into the $NO_x$ absorbent to become rich or Stoichiometric, and thereby causing the $NO_x$ accumulated in the $NO_x$ absorbent to be released from the $NO_x$ absorbent and to be reduced to nitrogen, and regeneration control means for activating the regenerating means to cause the air-fuel ratio of the exhaust gas flowing into the $NO_x$ absorbent to become rich or stoichiometric only when the temperature of the $NO_x$ absorbent is lower than a predetermined temperature.

As explained later in detail, it was found that the amount of the $NO_x$ flowing out from the $NO_x$ absorbent at the beginning of the regenerating process decreases as the temperature of the $NO_x$ absorbent becomes lower. In this aspect of the invention, the regeneration control means activates the regenerating means only when the temperature of the $NO_x$ absorbent is lower than a predetermined temperature. This predetermined temperature is selected so that the amount of the $NO_x$ that flows out from the $NO_x$ absorbent at the beginning of the regenerating process decreases to a practically negligible level at this temperature. Therefore, the regenerating process of the $NO_x$ absorbent is always started at the temperature lower than the predetermined temperature, to thereby minimized the outflow of $NO_x$.

According to another aspect of the present invention, there is provided an exhaust gas purification device for an internal combustion engine comprising a $NO_x$ absorbent disposed in an exhaust passage of an internal combustion engine, the $NO_x$ absorbent absorbing $NO_x$ components in the exhaust gas of the engine when the air-fuel ratio of the exhaust gas flowing into the $NO_x$ absorbent is lean, and releasing the absorbed $NO_x$ components when the oxygen concentration in the exhaust gas becomes lower, regenerating means for causing the air-fuel ratio of the exhaust gas flowing into the $NO_x$ absorbent to become rich or stoichiometric, and thereby causing the $NO_x$ accumulated in the $NO_x$ absorbent to be released from the $NO_x$ absorbent and to be reduced to nitrogen, activating means for activating the regenerating means at a timing determined by the amount of the $NO_x$ accumulated in the absorbent, temperature detecting means for detecting the temperature of the $NO_x$ absorbent, and regeneration timing control means for controlling the activating means in such a manner that the timing of the activation of the regenerating means is delayed as the temperature of the $NO_x$ absorbent becomes high.

According to this aspect of the present invention, the timing of the activation of the regenerating means is delayed as the temperature of the $NO_x$ absorbent becomes high. Therefore, the regenerating process is carried out less frequently when the temperature of the $NO_x$ absorbent is high. Thus, the total amount of $NO_x$ emission is minimized since the regeneration of the $NO_x$ absorbent at a high temperature, in which a larger amount of $NO_x$ flows out from the $NO_x$ absorbent, is carried out less frequently than that at a low temperature.

BRIEF DESCRIPTION OF THE DRAWINGS

The present invention will be better understood from the description as set forth hereinafter, with reference to the accompanying drawings, in which:

FIG. 10 is a drawing schematically illustrating an embodiment of the present invention which is different from the embodiments in FIGS. 1 and 9;

DESCRIPTION OF PREFERRED EMBODIMENTS

Figure 1:
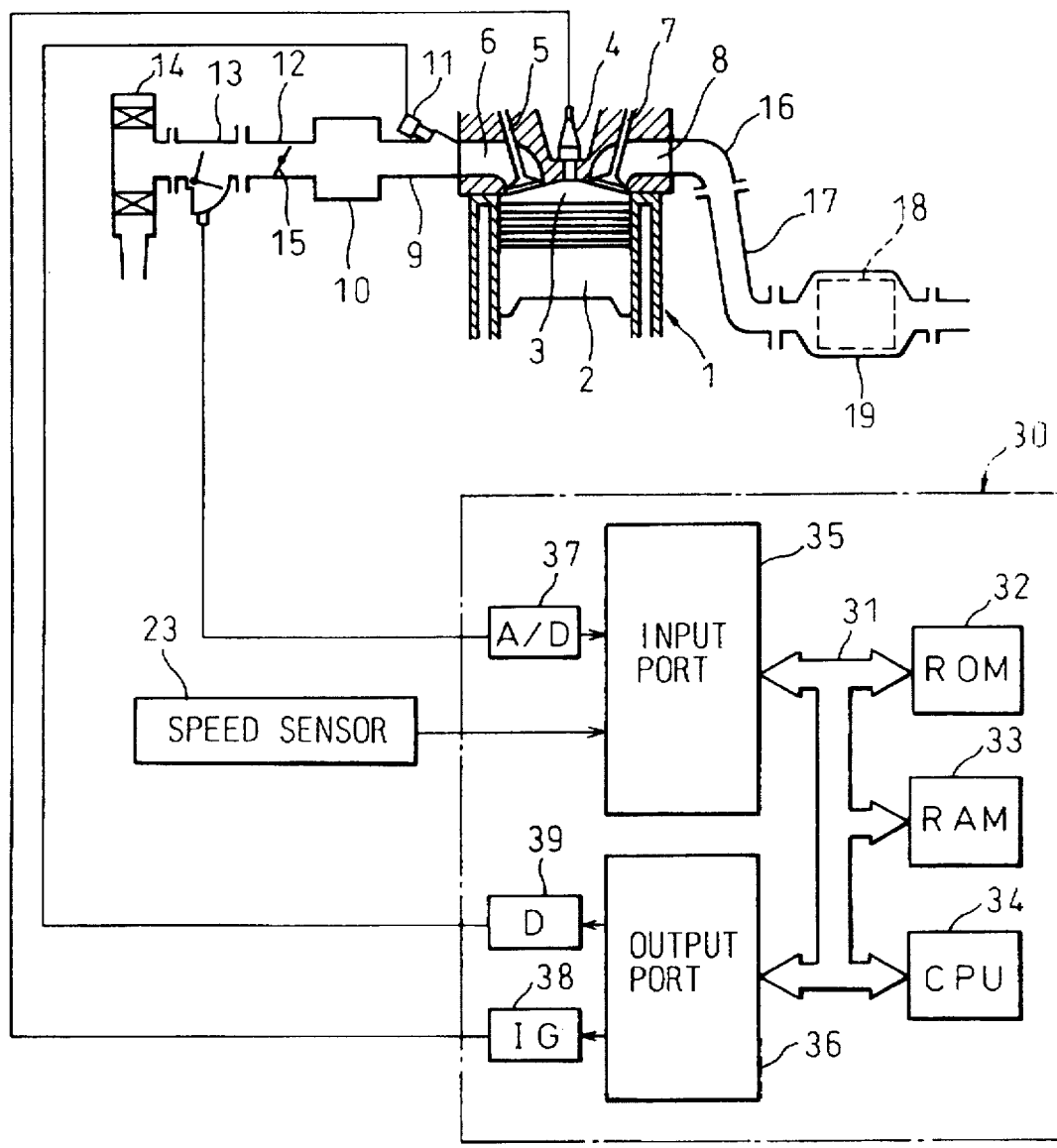
FIG. 1 is a drawing schematically illustrating an embodiment of the present invention when applied to an automobile engine.

FIG. 1 schematically illustrates an embodiment of the exhaust gas purification device according to the present invention. In FIG. 1, reference numeral 1 represents an internal combustion engine for an automobile. In this embodiment, the engine 1 is a multiple cylinder type engine, and FIG. 1 shows one of the cylinders of the engine 1.

In FIG. 1, the respective cylinders are provided with a combustion chamber 3, a piston 2, an ignition plug 4, an intake port 6 with an intake valve 6 and an exhaust port 8 with an exhaust valve 7. The intake ports 6 of the respective cylinders are connected to a surge tank 10 by an intake manifold 9, and on the intake manifold 9, a fuel injection valve 11 is disposed near the intake port of the respective cylinders to inject a pressurized fuel into the intake port 6 of the respective cylinders.

The surge tank 10 is connected to an intake air filter 14 via an intake air duct 12 and an air-flow meter 13. 15 represents a throttle valve disposed on the intake air duct 12.

The exhaust ports 8 of the respective cylinders are connected to a common exhaust pipe 17 by means of an exhaust manifold 16. On the exhaust pipe 17, a casing 19 containing a $NO_x$ absorbent 18 is disposed. The $NO_x$ absorbent 18 will be explained later in detail.

Reference numeral 30 in FIG. 1 represents a control circuit of the engine 1. The control circuit 30 consists of, for example, a digital computer provided with a ROM (read only memory) 32, a RAM (random access memory) 33, a CPU (microprocessor) 34, an input port 35 and an output port 36, which are interconnected by a bi-directional bus 31.

The airflow meter 13 is, for example, a potentiometer-type which generates an analog voltage signal proportional to the amount of air flowing therethrough and drawn into the engine 1. The signal from the airflow meter 13 is transmitted to the input port 35 of the control circuit 30 through an analog-to-digital (A/D) converter 37. Further, pulse signals representing the rotational speed of the engine 1 are transmitted to the input port 35 from a speed sensor 23 disposed near the crankshaft of the engine 1.

The output port 36 is connected to the fuel injection valve 11 and the ignition plug 4 of the respective cylinders via a driving circuit 39 and an ignition circuit 38, respectively.

Figure 2:
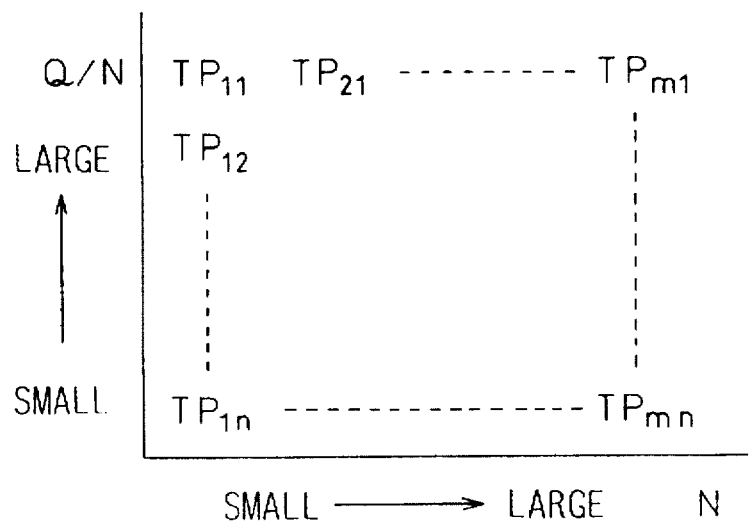
FIG. 2 shows a form of a numerical table used for the fuel injection amount calculation in the embodiment in FIG. 1.

In this embodiment, the control circuit 30 calculates the amount of the fuel injection TAU in a routine not shown based on the formula TAU=TP×Kt, where TP represents a base fuel injection amount and Kt represents a correction factor. The base fuel injection amount TP is an amount of the fuel required to maintain the air-fuel ratio of the air-fuel mixture in the combustion chamber at the stoichiometric air-fuel ratio. The value of the base fuel injection amount TP is determined by, for example, an experiment using an actual engine, and stored in the ROM 32 of the control circuit 30 in the form of a numerical table based on the engine load conditions (such as the amount of intake air per one revolution of the engine, Q/N and engine speed N) as parameters. FIG. 2 shows a typical form of the numerical table used for calculating the base fuel injection amount TP.

The correction factor Kt is used for adjusting the operating air-fuel ratio (the air-fuel ratio of the air-fuel mixture supplied to the combustion chambers of the engine 1). When Kt is set at 1.0, the operating air-fuel ratio of the engine becomes the stoichiometric air-fuel ratio. When the correction factor Kt is set at Kt<1.0, the operating air-fuel ratio of the engine becomes higher than the stoichiometric air-fuel ratio, i.e., the engine is operated at a lean air-fuel ratio. On the contrary, when the correction factor Kt is set at Kt>1.0, the operating air-fuel ratio of the engine becomes lower than the stoichiometric air-fuel ratio, i.e., the engine 1 is operated at a rich air-fuel ratio.

In this embodiment, the value of Kt is maintained at, for example, Kt=0.7 in the usual operation of the engine 1 to operate the engine 1 at a lean air-fuel ratio.

Figure 3:
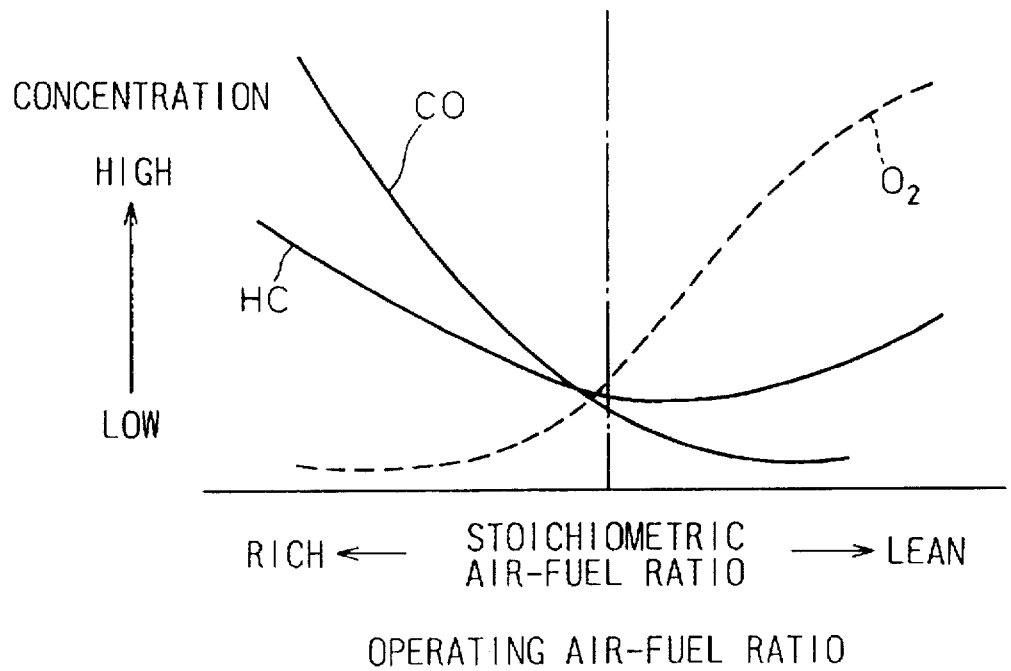
FIG. 3 is a graph illustrating the change in the concentrations of HC, CO and $O_2$ components in the exhaust gas according to the change in the operating air-fuel ratio of an internal combustion engine.

FIG. 3 schematically illustrates the changes in the concentrations of $O_2$ and unburned HC, CO components of the exhaust gas in accordance with the operating air-fuel ratio of the engine 1. As shown in FIG. 3, the concentrations of unburned HC and CO components increase as the operating air-fuel ratio of the engine becomes rich, and the concentration of the $O_2$ component increases as the operating air-fuel ratio becomes lean.

The $NO_x$ absorbent 18 in this embodiment uses, for example, alumina as a carrier and, on this carrier, precious metals such as platinum Pt rhodium Rh, and at least one substance selected from alkali metals such as potassium K, sodium Na, lithium Li and cesium Cs; alkali-earth metals such as barium Ba and calcium Ca; and rare-earth metals such as lanthanum La and yttrium Y are carried. The $NO_x$ absorbent 18 absorbs $NO_x$ in the exhaust gas flowing into the $NO_x$ absorbent when the air-fuel ratio of the exhaust gas is lean, and releases the absorbed $NO_x$ when the oxygen concentration of the exhaust gas flowing the $NO_x$ absorbent becomes lower.

In this specification, the term "air-fuel ratio of the exhaust gas" means a ratio of the amounts of the air and the fuel supplied to the engine or exhaust passages upstream of the $NO_x$ absorbent 18. Therefore, when no air and fuel is supplied in the exhaust passage upstream of the $NO_x$ absorbent 18, the air-fuel ratio of the exhaust gas becomes the same as the operating air-fuel ratio of the engine (i.e., the air-fuel ratio of the air-fuel mixture supplied to combustion chambers of the engine).

Figure 4A:
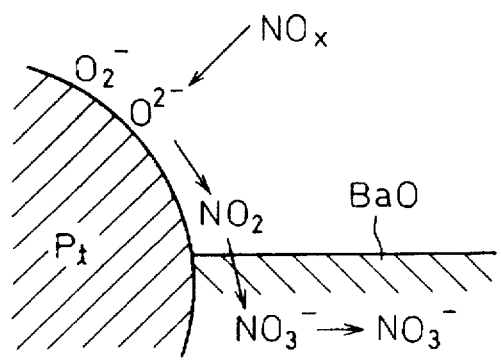
FIGS. 4A and 4B are drawings schematically illustrating the absorbing and releasing operation of $NO_x$ by a $NO_x$ absorbent.
Figure 4B:
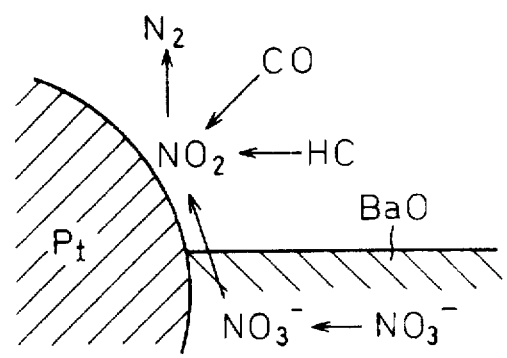

When the $NO_x$ absorbent is disposed in the exhaust passage of the engine, the $NO_x$ absorbent actually performs the above-mentioned absorption and releasing operation of $NO_x$. Though the mechanism of this absorption and releasing operation of the $NO_x$ absorbent is not clear at present, it is considered that the absorption and releasing operation is conducted by the mechanism shown in FIGS. 4A and 4B. FIGS. 4A and 4B explain the mechanism of the absorption and the releasing operation in the case where platinum Pt and barium Ba are carried on the carrier, as an example, but it is considered that a similar mechanism also applies even if other precious metal, alkali metals, alkali earth metals, or rare earth metals are used.

Namely, when the air-fuel ratio of the exhaust gas is lean, the concentration of oxygen in the exhaust gas becomes quite high. In this case, as shown in FIG. 4A, the oxygen $O_2$ is deposited on the surface of platinum Pt in the form of $O_2^-$ or $O^{2-}$. The NO in the exhaust gas reacts with $O_2^-$ or $O^{2-}$ on the surface of the platinum Pt and becomes $NO_2$ ($2NO+O_2 \rightarrow 2NO_2$). Then, a part of the produced $NO_2$ is oxidized on the platinum Pt and absorbed into the $NO_x$ absorbent. While bonding with the barium oxide BaO, it is diffused in the absorbent in the form of nitric acid ions $NO_3$ as shown in FIG. 4A. In this way, $NO_x$ is absorbed in the $NO_x$ absorbent.

As long as the oxygen concentration in the exhaust gas is high, the $NO_x$ is produced on the surface of the platinum Pt, and as long as the $NO_x$ is produced on the surface of the platinum Pt, and as long as the $NO_x$ absorption capacity of the absorbent is not saturated, the $NO_x$ is absorbed into the $NO_x$ absorbent and nitric acid ions $NO_3^-$ are produced.

On the other hand, when the oxygen concentration in the exhaust gas becomes low, the production of $NO_2$ is lowered and the reaction proceeds in an inverse direction ($NO_3^- \rightarrow NO_2$), and thus nitric acid ions $NO_3^-$ in the absorbent are released in the form of $NO_2$ from the $NO_x$ absorbent. Namely, when the oxygen concentration of the exhaust gas flowing into the $NO_x$ absorbent is lowered, absorbed $NO_x$ is released from the $NO_x$ absorbent. As explained in FIG. 3, the oxygen concentration in the exhaust gas decreases as the operating air-fuel ratio of the engine becomes lower. Therefore, even when the operating air-fuel ratio of the engine is lean compared to the stoichiometric air-fuel ratio, $NO_x$ is released from the $NO_x$ absorbent when the air-fuel ratio of the exhaust gas approaches to the stoichiometric air-fuel ratio.

In this case, if the operating air-fuel ratio of the engine is rich compared to the stoichiometric air-fuel ratio, a relatively large amount of HC, CO components are contained in the exhaust gas, and these components react with the oxygen $O_2^-$ or $O^{2-}$ on the platinum Pt and are oxidized. After oxygen $O_2^-$ or $O^{2-}$ on the platinum Pt are consumed by HC, CO in the exhaust gas, if HC and CO components still remain in the exhaust gas, $NO_x$ released from the $NO_x$ absorbent as well as $NO_x$ emitted from the engine are reduced by the HC and CO remaining on the platinum Pt. This oxidation of the HC and CO consumes the oxygen component existing near the $NO_x$ absorbent, and the concentration of oxygen in the atmosphere around the $NO_x$ absorbent is lowered. Also, the $NO_2$ released from the $NO_x$ absorbent reacts with the HC and CO in the exhaust gas as shown in FIG. 4B and reduced to $N_2$. In this way, when the $NO_2$ on the surface of the platinum Pt reacts with HC and CO in the exhaust gas, and when the $NO_2$ no longer exists on the surface of the platinum Pt, the $NO_2$ is successively released from the absorbent. Accordingly, when HC and CO components exist in the exhaust gas flowing into the $NO_x$ absorbent, the $NO_x$ is released from $NO_x$ absorbent and quickly reduced to $N_2$.

In this case, the HC and CO component in the exhaust gas immediately react with the $O_2^-$ or $O^{2-}$ on the platinum Pt and are oxidized, and subsequently if the HC and CO still remain after the $O_2^-$ or $O^{2-}$ on the platinum Pt are consumed, the $NO_x$ released from the absorbent and the $NO_x$ emitted from the engine are reduced.

The engine 1 in FIG. 1 is usually operated at a lean air-fuel ratio (for example, Kt=0.7). Therefore, the $NO_x$ emitted from the engine 1 is absorbed by the $NO_x$ absorbent 18 during the usual operation. However, when the amount of $NO_x$ accumulated in the $NO_x$ absorbent increases, the $NO_x$ absorbent is saturated with $NO_x$, and the capability of the $NO_x$ absorbent for absorbing $NO_x$ falls. In this embodiment, when the engine is operated at a lean air-fuel ratio continuously, the operating air-fuel ratio of the engine is shifted to a rich air-fuel ratio in a short time. By operating the engine at a rich air-fuel ratio, the $NO_x$ accumulated in the $NO_x$ absorbent is released from the $NO_x$ absorbent and reduced, i.e., the $NO_x$ absorbent is regenerated and recovers the capability for absorbing $NO_x$.

Figure 5:
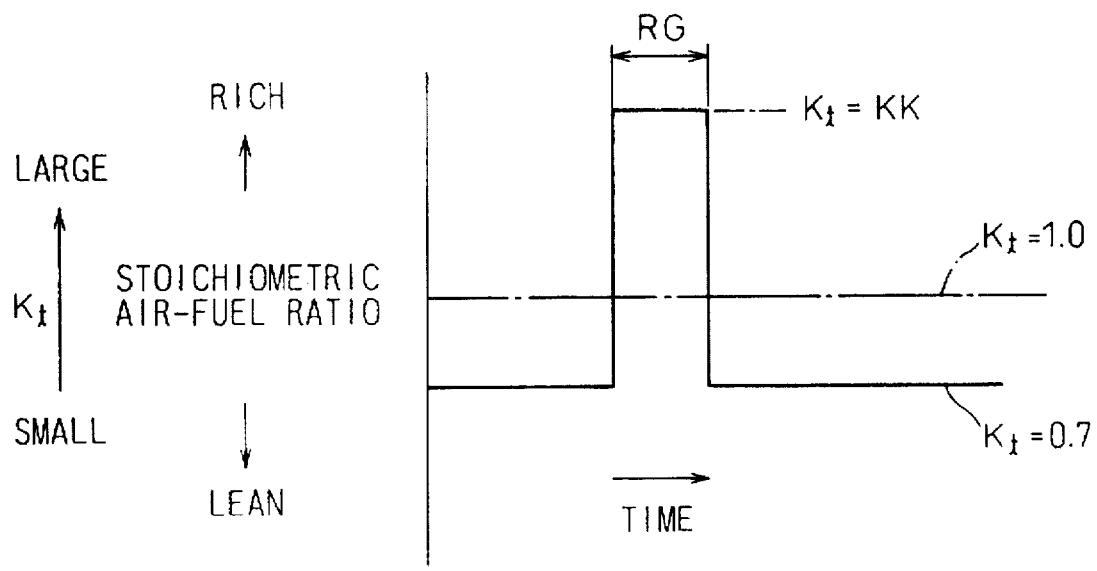
FIG. 5 is a drawing showing the setting of the operating air-fuel ratio of the engine during the regenerating process of the $NO_x$ absorbent.

FIG. 5 shows the settings of the correction factor Kt during the regeneration process of the $NO_x$ absorbent. As shown in FIG. 5, during the regenerating process (period shown by RG in FIG. 5), the value of the correction factor Kt is set at larger value KK (KK>1.0) to shift the air-fuel ratio of the exhaust gas flowing into the $NO_x$ absorbent 18 to rich compared to the stoichiometric air-fuel ratio.

However, as explained before, when the air-fuel ratio of the exhaust gas is shifted to rich, i.e., when the regenerating process starts, $NO_x$ flows out from the $NO_x$ absorbent for a short period immediately after the regenerating process starts.

Figure 6:
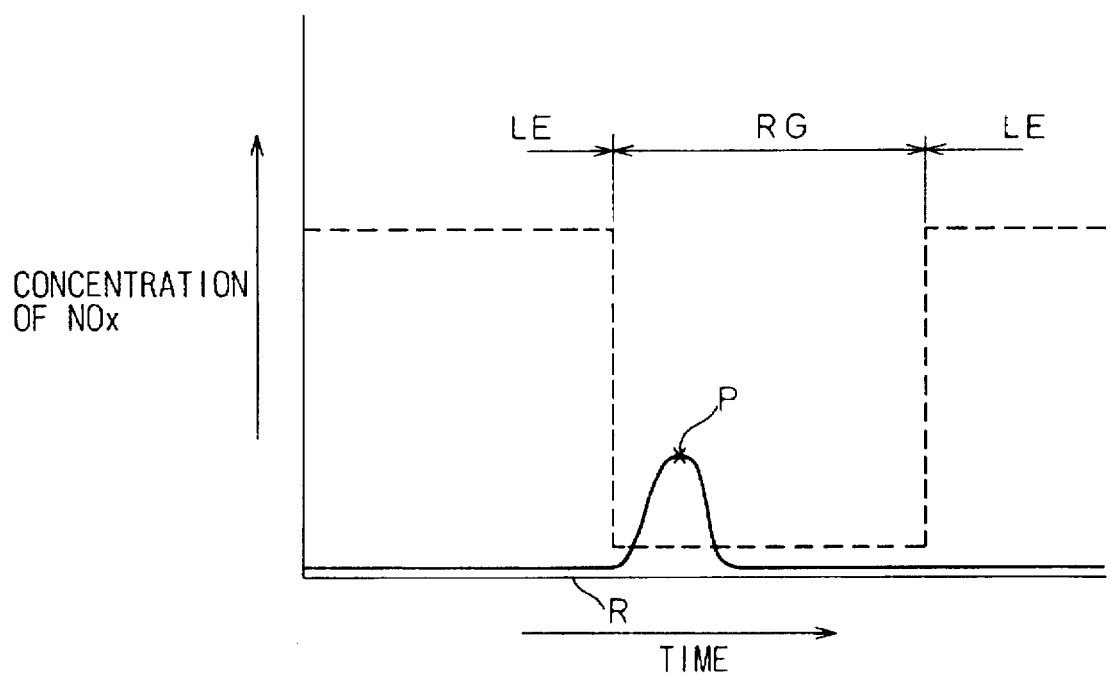
FIG. 6 is a drawing explaining the outflow of $NO_x$ from the $NO_x$ absorbent during the regenerating process.

FIG. 6 schematically illustrates this outflow of $NO_x$ from the $NO_x$ absorbent at the beginning of the regenerating process. In FIG. 6, the vertical axis represents the concentration of $NO_x$ in the exhaust gas, and the horizontal axis represents time. The dotted line in FIG. 6 represents the concentration of the $NO_x$ in the exhaust gas flowing into the $NO_x$ absorbent 18, and the solid line represents the same in the exhaust gas flowing out from the $NO_x$ absorbent 18. Further, the period indicated by LE in FIG. 6 represents the normal operation of the engine (i.e., the period in which the engine is operated at a lean air-fuel ratio), and the period indicated by RG represents the regenerating period of the $NO_x$ absorbent (i.e., the period in which the engine is operated at a rich air-fuel ratio).

As shown by FIG. 6, when the engine is operated at a lean air-fuel ratio (the period LE in FIG. 6), the concentration of $NO_x$ in the exhaust gas flowing into the $NO_x$ absorbent 18 (dotted line in FIG. 6) is relatively high, but the same in the exhaust gas flowing out from the $NO_x$ absorbent 18 (solid line in FIG. 6) is very low since substantially all of the $NO_x$ in the exhaust gas is absorbed by the $NO_x$ absorbent 18. When the regenerating period (period RG in FIG. 6) starts, the concentration of $NO_x$ in the exhaust gas flowing into the $NO_x$ absorbent 18 becomes low since the amount of the $NO_x$ emitted from the engine 1 becomes small during a rich air-fuel ratio operation. However, the concentration of $NO_x$ in the exhaust gas flowing out from the $NO_x$ absorbent 18 increases temporarily immediately after the air-fuel ratio of the exhaust gas flowing into the $NO_x$ absorbent shifts to a rich air-fuel ratio at the point R in FIG. 6. This increase in the $NO_x$ in the exhaust gas flowing out from the $NO_x$ absorbent 18 lasts only for a short time and the concentration of $NO_x$ becomes very low after passing a peak value at the point P in FIG. 6. Further, according to the results of experiments, it is found that the peak value of the concentration of the $NO_x$ in the exhaust gas flowing out from the $NO_x$ absorbent 18 (the concentration of $NO_x$ at the point P in FIG. 6) depends on the temperature of the $NO_x$ absorbent 18 when the regenerating process started.

Figure 7:
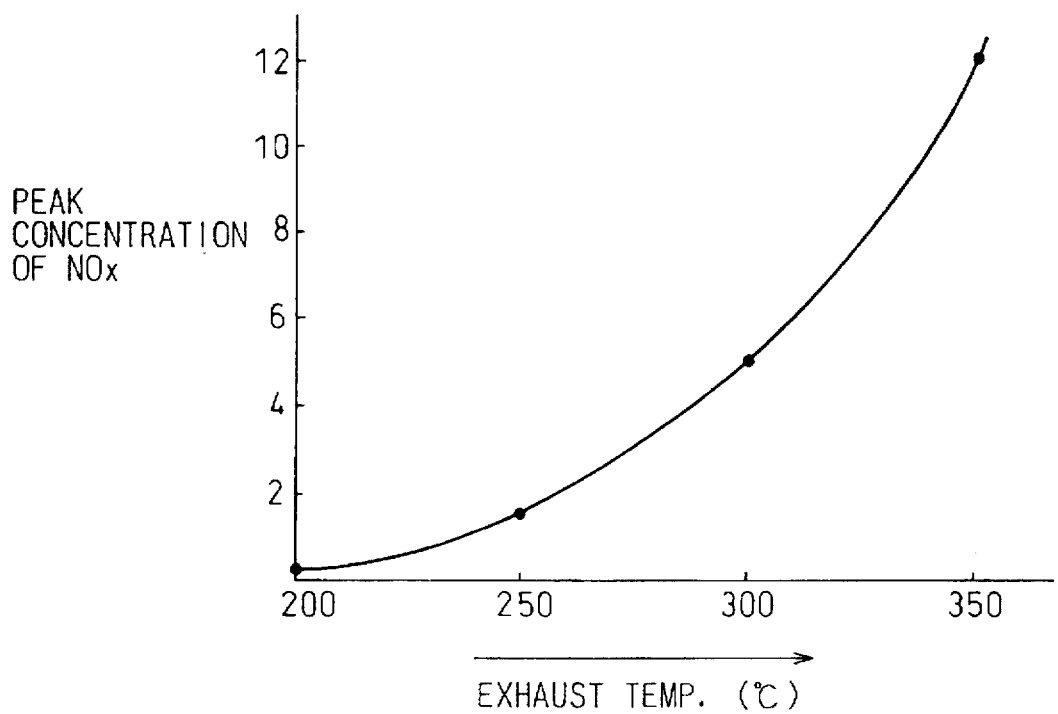
FIG. 7 is a graph illustrating the change in the amount of the outflow of $NO_x$ according to the temperature of the $NO_x$ absorbent.

FIG. 7 shows the peak value of the amount of the $NO_x$ flowing out from the $NO_x$ absorbent measured at different temperatures of the $NO_x$ absorbent. The $NO_x$ absorbent used in the measurement in FIG. 7 has a substrate having a volume of 1.7 liters, and uses 2.0 g/liter of platinum Pt, 0.1 g/liter of rhodium Rh, 0.3 g/liter of barium Ba, and 0.1 g/liter of lithium Li. However, when other precious metals, alkali metals, alkali-earth metals, and rare-earth metals are used for the $NO_x$ absorbent, similar results are obtained.

The vertical axis in FIG. 7 uses the peak value of the concentration of the $NO_x$ in the exhaust gas flowing out from the $NO_x$ absorbent (the concentration at the point P in FIG. 6) as a representative of the amount of outflow $NO_x$, and the horizontal axis in FIG. 7 uses the temperature of the exhaust gas flowing into the $NO_x$ absorbent as a representative of the temperature of $NO_x$ absorbent. As shown in FIG. 7, the amount of outflow $NO_x$ decreases as the temperature of the $NO_x$ absorbent becomes lower and, in the case of FIG. 7, the amount of outflow $NO_x$ becomes almost negligible when the temperature of the $NO_x$ absorbent (exhaust gas temperature) is lower than 200 degrees centigrade.

The reason why the outflow of $NO_x$ from the $NO_x$ absorbent at the beginning of the regenerating period substantially stops when the temperature of the $NO_x$ absorbent is lower than a certain temperature is not clearly known at present. However, this can be caused by one or more of the following reasons:

(1) the rate of the discharge of $NO_x$ from the $NO_x$ absorbent is dependent on both the temperature of the $NO_x$ absorbent and the air-fuel ratio of the exhaust gas. When the air-fuel ratio of the exhaust gas shifts towards rich, the discharge rate of the $NO_x$ increases. However, when the temperature is low, the change in the discharge rate of the $NO_x$ due to the change in the air-fuel ratio is smaller compared to the same when the temperature is high. Therefore, the increase in the discharge rate of the $NO_x$ becomes smaller compared to the shifting speed of the air-fuel ratio when the temperature of the $NO_x$ absorbent is low. Thus, when the air-fuel ratio of the exhaust gas passes the intermediate air-fuel ratio region, the discharge rate of $NO_x$ becomes small when the temperature of the $NO_x$ absorbent is low;

(2) when the temperature is relatively low, the $NO_x$ absorbent possesses a selective reducing capability for $NO_x$, i.e., the capability for reacting HC and CO components with $NO_x$ components selectively even when $O_2$ component exist;

(3) when the temperature is relatively low, the $NO_x$ released from absorbent reacts with HC, CO components in the presence of precious metal catalytic components and forms $NH_3$, which, then reacts immediately with $NO_x$ ($NO_2$) released from absorbent by a denitrating reaction of, $8NH_3+6NO_2 \rightarrow 12H_2O+7N_2$, thereby the $NO_x$ released from the absorbent is immediately reduced by the denitrating reaction.

Though the reason is not clear, it is confirmed by experiment that the amount of the outflow of the $NO_x$ at the beginning of the regenerating process actually decreases when the temperature of the $NO_x$ absorbent is low.

Taking this temperature dependency of the outflow of the $NO_x$, the regenerating process in this embodiment is performed only when the temperature of the $NO_x$ absorbent is lower than the temperature at which the outflow of the $NO_x$ practically does not occur (for example, lower than 200° C. in case of FIG. 7).

The temperature of the $NO_x$ absorbent is determined by the temperature of the exhaust gas flowing into the $NO_x$ absorbent, and the exhaust gas temperature of the engine is determined by the operating conditions of the engine (such as the amount of the intake air per one revolution of the engine Q/N and engine speed N). Therefore, the exhaust gas temperature of the engine can be calculated from the operating conditions of the engine. In this embodiment, the relationship between the temperature of the $NO_x$ absorbent 18 and operating conditions of the engine 1 is obtained, for example, by experiment, and this relationship is stored in the ROM 32 in control circuit 30. During the operation of the engine, the control circuit 30 calculates the temperature of the $NO_x$ absorbent from the operating conditions of the engine and performs the regenerating process when the temperature of the $NO_x$ absorbent is lower than the temperature at which the outflow of $NO_x$ practically does not occur.

Figure 8:
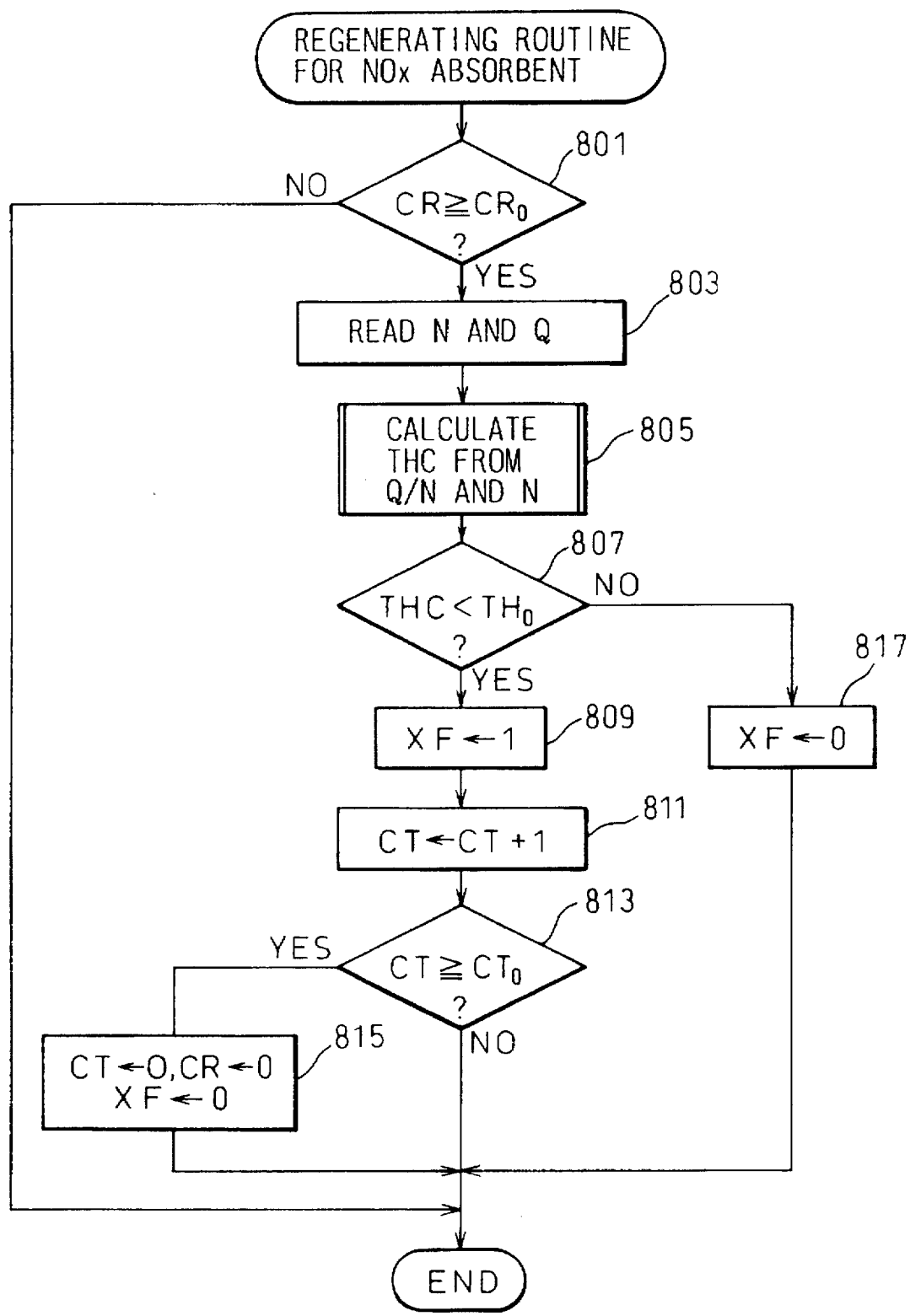
FIG. 8 is a flowchart explaining an embodiment of the regenerating process of the $NO_x$ absorbent in FIG. 1.

FIG. 8 shows a flowchart explaining the regenerating process of the $NO_x$ absorbent 18 in this embodiment. This routine is performed by the control circuit 30 at predetermined intervals.

When the routine starts, at step 801 in FIG. 8, it is determined whether it is necessary to start the regenerating process of the $NO_x$ absorbent 18 based on the value of the counter CR. As explained below, the value of the counter CR represents the amount of $NO_x$ accumulated in the $NO_x$ absorbent in this embodiment. If the value of the counter CR is larger than or equal to a predetermined value $CR_0$ at step 801, since this means that the amount of $NO_x$ accumulated in the $NO_x$ absorbent becomes large, it is determined that the regenerating process should be started.

It is considered that the amount of $NO_x$ accumulated in the $NO_x$ absorbent increases as the operation period of the engine increases. In this embodiment, the control circuit 30 increases the value of the counter CR by a predetermined amount at a regular intervals by a routine, not shown, during the lean air-fuel ratio operation of the engine. Therefore, the value of CR corresponds to the amount of $NO_x$ accumulated in the $NO_x$ absorbent. Instead of increasing the value of CR at regular intervals, CR may be increased every time when the engine rotates a predetermined number of times.

Further, the amount of $NO_x$ emitted from the engine changes in accordance with the operating conditions of the engine (such as Q/N and N). Since the amount of $NO_x$ accumulated in the $NO_x$ absorbent is considered to increase in accordance with the cumulative amount of $NO_x$ emitted from the engine, the amount of $NO_x$ accumulated in the $NO_x$ absorbent can be more precisely estimated by calculating a total amount of $NO_x$ emitted from the engine. Therefore, the amount of $NO_x$ accumulated in the $NO_x$ absorbent can be calculated by cumulating the amount of $NO_x$ emitted from the engine multiplied by a constant factor.

Figure 15:
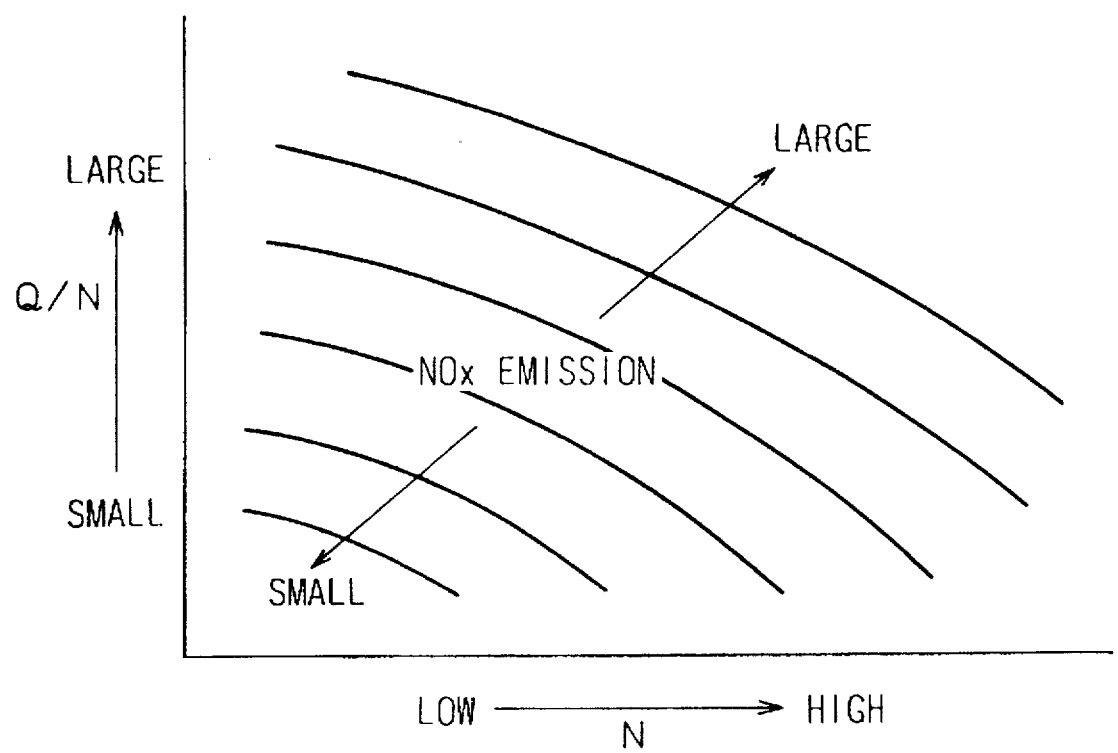
FIG. 15 is a graph schematically illustrating the change in the amount of $NO_x$ generated by an internal combustion engine in accordance with the operating conditions of the engine.

FIG. 15 shows a typical change in the amount of $NO_x$ emitted from an internal combustion engine in accordance with the operating conditions. In FIG. 15, the vertical axis represents the amount of intake air drawn by the engine per one revolution of the engine (Q/N), and the horizontal axis represents the engine speed (N). The curves in FIG. 15 shows the amount of $NO_x$ emitted from the engine per unit time. As seen from FIG. 15, when Q/N is constant, the amount of $NO_x$ emitted from the engine increases as the engine speed N increases, and when the engine speed N is constant, the amount of $NO_x$ increases as Q/N increases. In order to calculate the amount of $NO_x$ accumulated in the $NO_x$ absorbent, the amount of $NO_x$ emitted from the engine per unit time as shown in FIG. 15 is stored in the ROM 32 in control circuit 30 in the form of a numerical table based on Q/N and N which is similar to the numerical table in FIG. 2. The amount of $NO_x$ is read from the numerical table at regular intervals using measured Q/N and N, and the amount of $NO_x$ accumulated in the $NO_x$ absorbent is obtained as a cumulative value of the amount of $NO_x$ read from the table. This cumulative value can be used as the parameter of the amount of the $NO_x$ accumulated in the $NO_x$ absorbent at step 801 instead of the counter CR.

Figure 11A:
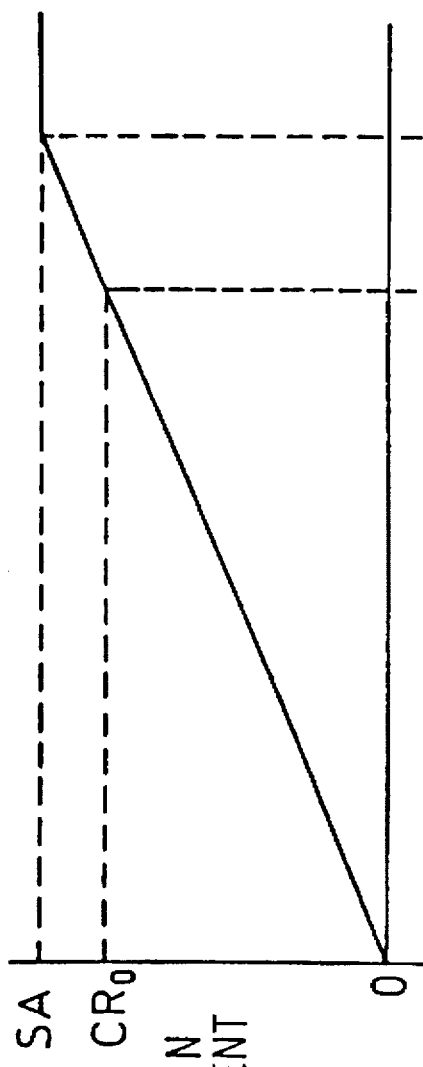
FIG. 11 is a drawing illustrating the change in the capability of the $NO_x$ absorbent for absorbing $NO_x$ in accordance with the amount of $NO_x$ accumulated in the $NO_x$ absorbent.
Figure 11B:
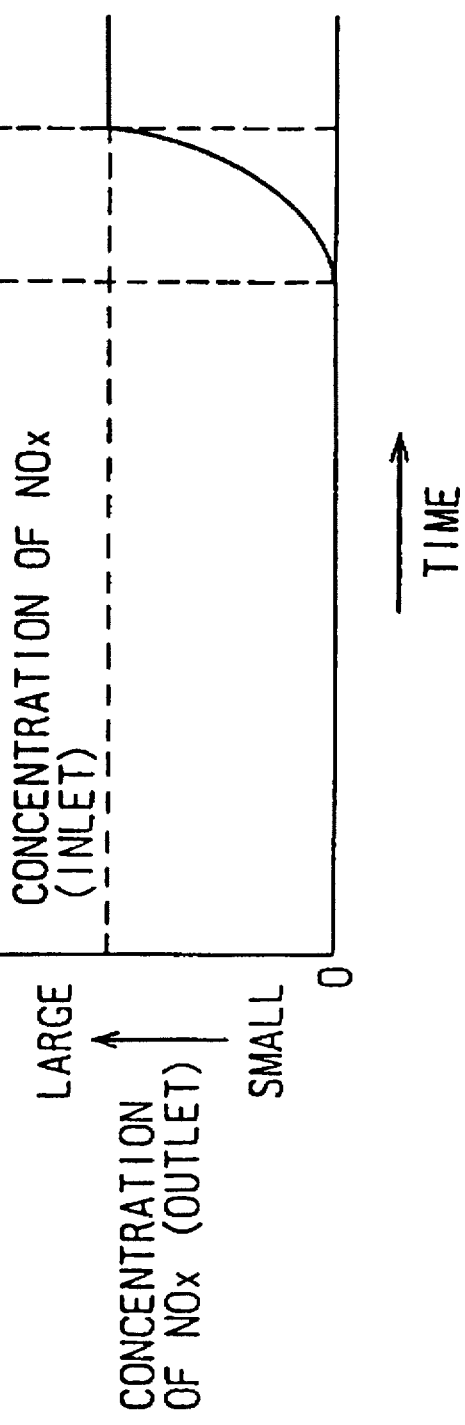

Next, the setting of the value $CR_0$ in FIG. 8 (step 801) is explained. FIG. 11 shows changes in the amount of the $NO_x$ accumulated in the $NO_x$ absorbent and in the concentration of $NO_x$ in the exhaust gas flowing out from the $NO_x$ absorbent in accordance with the time lapsed after the absorbing operation of the $NO_x$ absorbent. The curve (a) in FIG. 11 shows the amount of the $NO_x$ accumulated in the $NO_x$ absorbent. As seen from the curve (a), the amount of the $NO_x$ accumulated in the $NO_x$ absorbent increases as the time after the absorption of $NO_x$ starts, and when the amount of the $NO_x$ accumulated in the $NO_x$ absorbent reaches a saturated amount (indicated by SA in FIG. 11), the $NO_x$ absorbent cannot absorb the $NO_x$ in the exhaust gas any more.

The curve (b) in FIG. 11 shows the concentration of the $NO_x$ in the exhaust gas downstream of the $NO_x$ absorbent. As seen from curve (b), the concentration of the $NO_x$ downstream of the $NO_x$ absorbent is nearly 0 when the amount of the $NO_x$ accumulated in the $NO_x$ absorbent (curve (a)) is low, i.e., substantially all of the $NO_x$ in the exhaust gas flowing into the $NO_x$ absorbent is absorbed by the $NO_x$ absorbent. However, the capability of the $NO_x$ absorbent for absorbing $NO_x$ falls as the amount of the $NO_x$ accumulated in the $NO_x$ absorbent increases, and when the $NO_x$ in the $NO_x$ absorbent exceeds a certain value (for example, $CR_0$), a part of $NO_x$ in the exhaust gas flowing into the $NO_x$ absorbent passes through the $NO_x$ absorbent without being absorbed. The amount of the $NO_x$ passing through the $NO_x$ absorbent increases as the amount of the $NO_x$ accumulated in the $NO_x$ absorbent increases, and, when the $NO_x$ absorbent is saturated with $NO_x$, all of the $NO_x$ in the exhaust gas flowing into the $NO_x$ absorbent passes through the $NO_x$ absorbent, i.e., the concentration of $NO_x$ in the exhaust gas downstream of the $NO_x$ absorbent becomes substantially the same as the concentration of $NO_x$ in the exhaust gas upstream of the $NO_x$ absorbent.

As seen from FIG. 11, curves (a) and (b), the value of the $CR_0$ in this embodiment is determined in such a manner that when the amount of the $NO_x$ accumulated in the $NO_x$ absorbent reaches the value $CR_0$, the concentration of $NO_x$ in the exhaust gas downstream of the $NO_x$ absorbent starts to increase. For example, the value of the $CR_0$ is set at 70 to 80% of the amount of the $NO_x$ accumulated in the $NO_x$ absorbent when it is saturated. The value of the $CR_0$ changes according to various conditions such as type and size of the $NO_x$ absorbent, the concentration of the $NO_x$ in the exhaust gas and the flow velocity of the exhaust gas passing through the $NO_x$ absorbent. Therefore, it is preferable to determine the value of the $CR_0$ by experiment using the actual $NO_x$ absorbent.

In FIG. 8, at step 801, the value of the counter CR is compared with the value $CR_0$, and if $CR<CR_0$, it is determined that the amount of the $NO_x$ accumulated in the $NO_x$ absorbent is small, and the routine terminates without processing further steps since it is not necessary to carry out the regenerating process. If $CR \geq CR_0$ at step 801, since the amount of the $NO_x$ accumulated in the $NO_x$ absorbent 18 increases, it is necessary to carry out the regenerating process. Therefore, the routine proceeds to step 803 which reads the intake air amount Q and the engine speed N from the sensors 13 and 23, respectively. At step 803, the intake air amount per one revolution of the engine Q/N is calculated from Q and N read at step 801, and the present temperature THC of the $NO_x$ absorbent 18 is calculated using Q/N and N. In this embodiment, the temperature THC of the $NO_x$ absorbent 18 at various load conditions (i.e., Q/N and N) are previously obtained, by experiment, and stored in the ROM 32 of the control circuit 30 as a numerical table in the form similar to that in FIG. 2. At step 805, the present temperature THC of the $NO_x$ absorbent 18 is determined from this numerical table.

At step 807 in FIG. 8, it is determined whether the temperature THC is lower than a predetermined temperature $TH_0$. $TH_0$ is the temperature at which the amount of the outflow of $NO_x$ is practically negligible, and determined by, for example, experiment. In case of FIG. 7, $TH_0$ is set at a value, for example, between 250° and 300° C. The value of $TH_0$ may be determined based on, for example, the maximum value of $NO_x$ emission allowed by regulations.

If $THC<TH_0$ at step 807, the value of a flag XF is set at 1 at step 809. XF is a regeneration flag, and when the value of the flag XF is set at 1, the value of the correction factor Kt is set at KK (KK>1.0) in a fuel injection amount calculation routine (not shown) to make the operating air-fuel ratio of the engine rich.

Steps 811 and 812 are the steps for determining the time for terminating the regenerating process. Namely, a counter CT is increased by 1 at step 811, and when the value of CT reaches a predetermined value $CT_0$ at step 812, i.e., when a predetermined time lapsed since the regenerating process starts, the value of the regeneration flag is reset at 0, and at the same time, the values of the counters CR and CT are cleared. When the value of the regeneration flag XF is reset at 0, the correction factor Kt is set at a value less than 1.0 (for example, 0.7) to operate the engine at a lean air-fuel ratio.

In general, it was heretofore considered that a high temperature of the $NO_x$ absorbent was preferable for carrying out the regeneration process in order to promote the regeneration of the $NO_x$ absorbent by increasing the discharge rate of $NO_x$ from the absorbent. Since the regeneration process in this embodiment is carried out only when the temperature of the $NO_x$ absorbent is relatively low, the time required for regenerating the $NO_x$ absorbent becomes longer. However, this increase in the regeneration time is small and does not cause any problems in actual operation of the engine.

If the temperature THC of the $NO_x$ absorbent 18 is higher than or equal a predetermined value ($THC \geq TH_0$) at step 807, the value of the regeneration flag XF is reset to 0 at step 817. In this case, the regenerating process of the $NO_x$ absorbent 18 is not performed.

As explained above, since the regenerating process of the $NO_x$ absorbent 18 is not performed when the outflow of $NO_x$ is expected (i.e., when the temperature of the $NO_x$ absorbent 18 is high), the increase of the emission of the $NO_x$ caused by the outflow of $NO_x$ at the beginning of the regenerating process can be prevented.

Though the temperature of the $NO_x$ absorbent is detected indirectly based on the operating conditions of the engine in the above embodiment, the temperature of the $NO_x$ absorbent can be detected directly by a temperature sensor disposed in the substrate of the $NO_x$ absorbent. The temperature of the $NO_x$ absorbent can be also detected indirectly based on the exhaust gas temperature measured directly by an exhaust gas temperature sensor disposed at the inlet of the $NO_x$ absorbent.

Next, another embodiment of the present invention is explained with reference to FIG. 9.

In the embodiment explained above, the regenerating process of the $NO_x$ absorbent is carried out only when the temperature of the $NO_x$ absorbent is lower than a predetermined temperature. Therefore, there is a possibility that the $NO_x$ absorbent is saturated with $NO_x$ when the high exhaust gas temperature continues for a long time. In the present embodiment, the temperature of the $NO_x$ absorbent is lowered so that the temperature of the $NO_x$ absorbent is maintained lower than a predetermined temperature, at least when the regenerating process is carried out. Therefore, the regeneration of the $NO_x$ absorbent in this embodiment is carried out regardless of the operating conditions of the engine.

Figure 9:
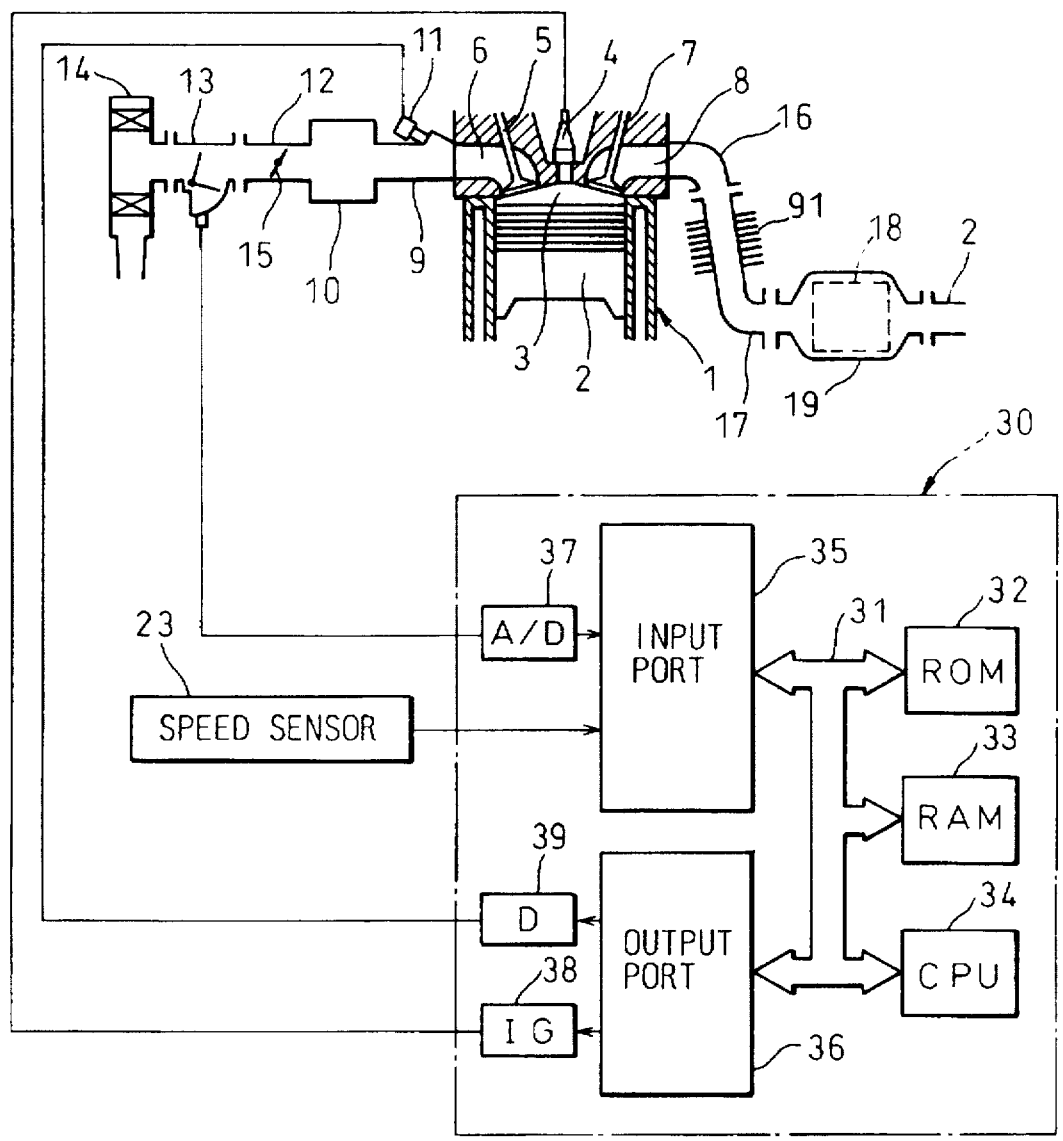
FIG. 9 is a drawing schematically illustrating another embodiment of the present invention.

FIG. 9 schematically illustrates the exhaust gas purification device of the present embodiment. The reference numerals in FIG. 9 which are same as those in FIG. 1 represent similar elements as those in FIG. 1. The device shown in FIG. 9 has an arrangement generally similar to the device in the embodiment in FIG. 1, except that cooling fins 91 are provided on the outer surface of the exhaust gas passage (exhaust pipe) 17. The total surface area of the fins 91 is set large enough to lower the exhaust gas temperature flowing through the exhaust pipe to a level lower than the predetermined temperature $TH_0$ explained in the previous embodiment even at the highest possible exhaust gas temperature.

In general, the exhaust gas temperature in the lean air-fuel ratio operation of the engine is lower than the exhaust gas temperature in the stoichiometric or rich air-fuel ratio operation of the engine. In this embodiment, since the cooling fins are further provided to keep the exhaust gas temperature during the lean air-fuel ratio operation lower than the predetermined temperature $TH_0$, the temperature of the $NO_x$ absorbent 18 is always kept lower than the predetermined temperature, at least, at the beginning of the regenerating process (i.e., when the operating air-fuel ratio of the engine is changed from a lean air-fuel ratio to a rich air-fuel ratio). Therefore, in this embodiment, the regenerating process of the $NO_x$ absorbent can be performed regardless of the load conditions of the engine and, thereby, the saturation of the $NO_x$ absorbent with $NO_x$ is effectively prevented from occurring.

Though the cooling fins 91 are used to lower the exhaust gas temperature in this embodiment, an expansion type muffler may be provided on the exhaust pipe upstream of the $NO_x$ absorbent 18 to lower the exhaust gas temperature. When the exhaust gas flows through the expansion type muffler, the exhaust gas temperature is lowered due to the expansion of the exhaust gas. Further, since the expansion type muffler has relatively large heat capacity, the exhaust gas temperature flowing into the $NO_x$ absorbent 18 is maintained at nearly constant even when the exhaust gas temperature at the engine outlet varies if the expansion type muffler is used. Therefore, the temperature of the $NO_x$ absorbent is securely maintained lower than the predetermined temperature.

Next, another embodiment of the present invention will be explained with reference to FIG. 10. In the previous embodiment, the present invention is applied to engines operated at a lean air-fuel ratio over most of the operating range. However, the present invention can also be applied to engines operated at the stoichiometric or a rich air-fuel ratio over most of the operating range. FIG. 10 shows an embodiment of the exhaust gas purification device in which the present invention is applied to an engine operated at a slightly rich air-fuel ratio (such as, at an air excess ratio of about 0.95).

In FIG. 10, reference numeral 101 designates an internal combustion engine operated at a slightly rich air-fuel ratio, 117 designates an exhaust pipe of the engine 101. Other elements designated by same reference numbers as those in FIG. 1 are the same elements as those in FIG. 1. In the exhaust pipe 117, a three-way reducing and oxidizing catalyst 121, oxidizing catalyst 122 and a $NO_x$ absorbent 118 are disposed in this order from the upstream side of the exhaust pipe. The $NO_x$ absorbent 118 is same type as that of the previous embodiments. Further, a secondary air supply unit 123 is provided in this embodiment. The secondary air supply unit 123 includes an air source 123a such as an air pump and a shut off/control valve 123b to supply a secondary air to the exhaust pipe 117 at the portion between the three-way reducing and oxidizing catalyst 121 and the oxidizing catalyst 122. The engine 101 in this embodiment is operated at a slightly rich air fuel ratio. Therefore, the exhaust gas from the engine contains a relatively small amount of $NO_x$ components and a relatively large amount of unburned HC, CO components. As is well known, when the air-fuel ratio of the exhaust gas is rich, the three-way reducing and oxidizing catalyst 121 is capable of removing substantially all the $NO_x$ in the exhaust gas but it converts a small portion of $NO_x$ in the exhaust gas into $NH_3$. Therefore, the exhaust gas flowing out from the three-way reducing and oxidizing catalyst 121 includes a very small amount of $NH_3$ and a relatively large amount of HC and CO. The secondary air supply unit 123 supplies air to this exhaust gas to make the air-fuel ratio of this exhaust gas lean. Thus, the exhaust gas flowing into the oxidizing catalyst 122 has a lean air-fuel ratio. When this lean air-fuel ratio exhaust gas flows through the oxidizing catalyst 122, the unburned HC, CO components in the exhaust gas are oxidized and removed by the catalyst 122 and, at the same time, the $NH_3$ in the exhaust gas is also oxidized by catalyst 122 to form $NO_x$.

Namely, the exhaust gas flowing into the $NO_x$ absorbent 118 has a lean air-fuel ratio and contains a small amount of $NO_x$ components, but the exhaust gas does not contain HC and CO components. Since this small amount of the $NO_x$ in the exhaust gas is absorbed by the $NO_x$ absorbent, the exhaust gas downstream of the $NO_x$ absorbent 118 is substantially free from HC, CO, $NO_x$ and $NH_3$.

The regenerating process of the $NO_x$ absorbent 118 in this embodiment is carried out by stopping the supply of the secondary air from the unit 123. When the supply of the secondary air is stopped, the air-fuel ratio of the exhaust gas flowing into the oxidizing catalyst 122 becomes rich, and the oxidation of the HC, CO and $NH_3$ components by the oxidizing catalyst does not occur. Therefore, an exhaust gas having same components as the exhaust gas at the outlet of the three-way reducing and oxidizing catalyst 121, i.e., an exhaust gas of a rich air-fuel ratio containing a small amount of $NH_3$ and a relatively large amount of HC, CO flows into the $NO_x$ absorbent 118. Thus, the $NO_x$ absorbed in the $NO_x$ absorbent 118 is released from the absorbent in the rich atmosphere, and reduced by the HC, CO in the exhaust gas.

In the present embodiment, the regeneration of the $NO_x$ absorbent 118, in this case, by stopping the supply of the secondary air, is carried out only when the temperature of the $NO_x$ absorbent 118 is lower than the predetermined temperature $TH_0$ to prevent the outflow of $NO_x$ at the beginning of the regeneration process. Further, since the amount of the $NO_x$ in the exhaust gas flowing into the $NO_x$ absorbent 118 is very small in this embodiment, the intervals required for the regeneration of the $NO_x$ absorbent 118 are quite long compared to those of the previous embodiments. Therefore, even if the regeneration of the $NO_x$ absorbent is not performed for a long time, the saturation of the $NO_x$ absorbent with $NO_x$ does not occur in this embodiment. Further, in this embodiment, the cooling fins similar to FIG. 9, or the muffler may be provided on the exhaust pipe between the oxidizing catalyst 121 and the $NO_x$ absorbent 118 to keep the temperature of the $NO_x$ absorbent 118 lower than the predetermined temperature at the beginning of the regenerating process.

Next, an embodiment different from the previous embodiments is explained. The arrangement of the device in this embodiment is the same as that of FIG. 1. However, though the regenerating process is carried out only when the temperature of the $NO_x$ absorbent is lower than a predetermined temperature to suppress the outflow of $NO_x$ in the embodiment in FIGS. 1 and 8, the regenerating process in this embodiment is carried out even when the temperature of the $NO_x$ absorbent is higher than the predetermined temperature. If the regenerating process is carried out frequently even when the temperature is high, the amount of $NO_x$ outflow becomes large. Therefore, the regeneration of the $NO_x$ absorbent in this embodiment is controlled so that the regenerating process is carried out less frequently when the temperature is high.

In the present embodiment, the frequency of the regeneration of the $NO_x$ absorbent is reduced by the following controls:

(1) when the temperature is low, the regenerating process of the $NO_x$ absorbent is performed when the amount of the $NO_x$ accumulated in the $NO_x$ absorbent reaches a relatively small value;

(2) when the temperature is high, the regenerating process of the $NO_x$ absorbent is not performed until the amount of the $NO_x$ accumulated in the $NO_x$ absorbent reaches a relatively large value;

(3) when the temperature of the $NO_x$ absorbent falls from a high temperature, the regenerating process is immediately carried out regardless of the amount of the $NO_x$ accumulated in the $NO_x$ absorbent.

By the above control (1), the amount of the $NO_x$ accumulated in the $NO_x$ absorbent is always maintained at a relatively small value during a low temperature operation of the $NO_x$ absorbent. Therefore, when a high temperature operation of the $NO_x$ absorbent starts, a relatively large capacity of the $NO_x$ absorbent for absorbing $NO_x$ is always preserved. This lowers the possibility of the regenerating process being carried out during a high temperature operation of the $NO_x$ absorbent of a short period.

Further, during a high temperature operation of the $NO_x$ absorbent, the regenerating process is not performed until the amount of the $NO_x$ accumulated in the $NO_x$ absorbent increases to a relatively large value by the above control (2). Therefore, the possibility of the regenerating process being performed during the high temperature operation is further lowered in addition to the above.

By the above control (3), the amount of the $NO_x$ accumulated in the $NO_x$ absorbent is lowered immediately after the high temperature operation of the $NO_x$ absorbent is terminated. Therefore, even if the high temperature operation is resumed shortly after the low temperature operation started, the $NO_x$ absorbent can start the absorbing operation of $NO_x$ with a small amount of $NO_x$ accumulated in the $NO_x$ absorbent.

Since the frequency of the regenerating process of the $NO_x$ absorbent are lowered by the above controls (1) to (3), when the temperature of the $NO_x$ absorbent is high, the probability that the regenerating process is carried out during the high temperature operation, i.e., the probability that the outflow of $NO_x$ occurs, becomes small, thereby the worsening of the $NO_x$ emission can be suppressed as a whole. Further, according to the present embodiment, the regenerating process of the $NO_x$ absorbent is carried out even during the high temperature operation if the amount of the $NO_x$ accumulated in the $NO_x$ absorbent substantially increases. Therefore, the worsening of the $NO_x$ emission due to the $NO_x$ absorbent being saturated with $NO_x$ does not occur even though the high temperature operation of the $NO_x$ absorbent continues for a long time.

Figure 12:
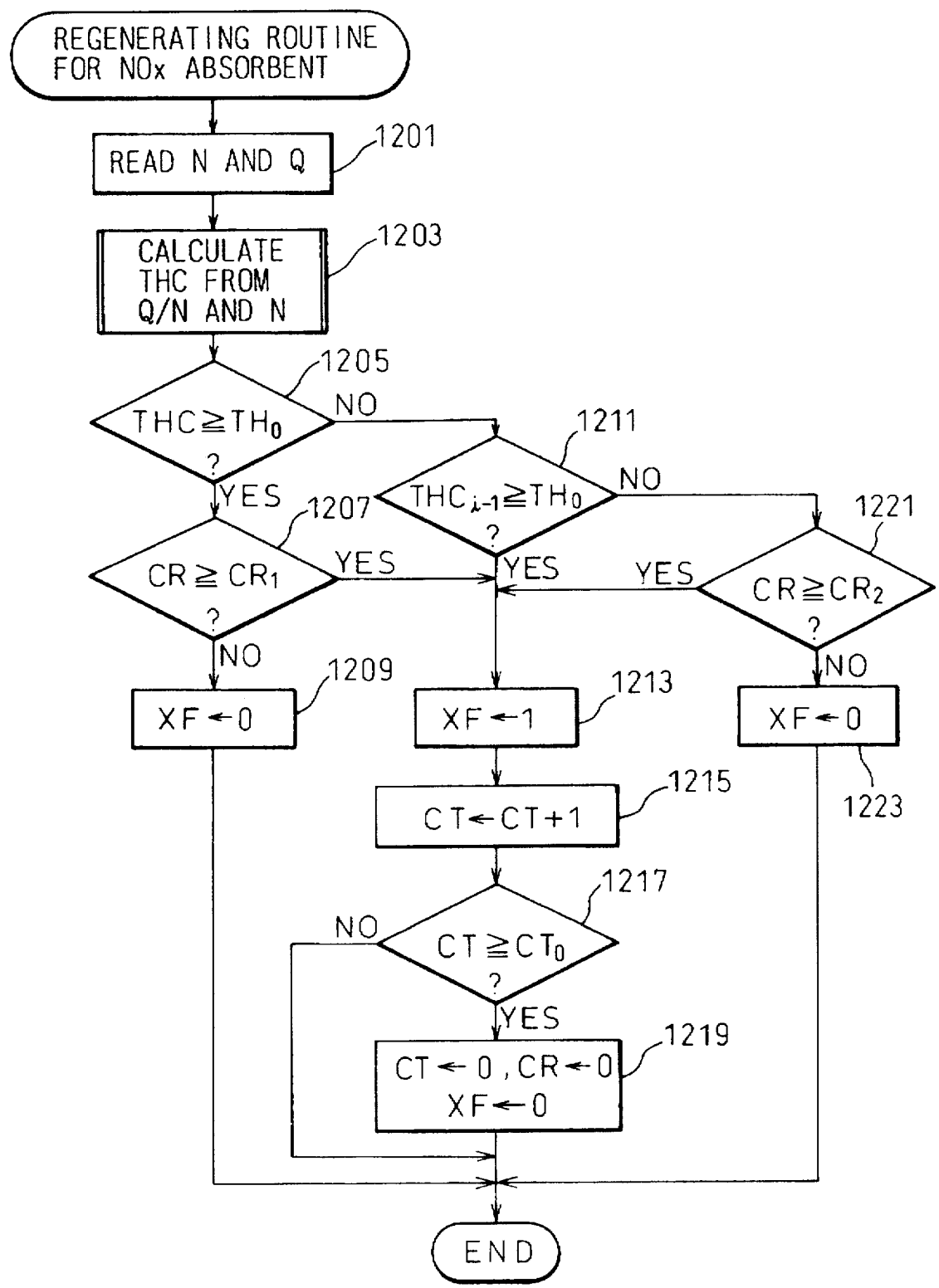
FIG. 12 is a flowchart explaining another embodiment of the regenerating process of the $NO_x$ absorbent.

FIG. 12 shows a flowchart of the regenerating process in the present embodiment. This routine is processed at regular intervals by the control circuit 30. In FIG. 12, at steps 1201 and 1203, the present temperature THC of the $NO_x$ absorbent is calculated. Steps 1201 and 1203 are the same as steps 801 and 803 in FIG. 8, and a detailed explanation is omitted here. 10 Further, at step 1205, it is determined whether the temperature THC of the $NO_x$ absorbent is higher than or equal to a predetermined value $TH_0$. The value $TH_0$ in this embodiment is set at the same level as that in FIG. 8, step 807.

If it is determined that the high temperature operation of the $NO_x$ absorbent is being carried out at step 1205 (i.e., $THC \geq TH_0$), the routine then proceeds to step 1207 which determines whether the amount CR of the $NO_x$ accumulated in the $NO_x$ absorbent has reached a predetermined value $CR_1$. The value $CR_1$ is set at a relatively large value in this embodiment (for example, about 70% of the amount of $NO_x$ when the $NO_x$ absorbent is saturated with $NO_x$). If $CR < CR_1$ at step 1207, the value of the flag XF is reset to 0 at step 1209, and the routine terminates immediately. The function of the regeneration flag XF is the same as that of FIG. 8 also in this embodiment.

However, if $CR \geq CR_1$ at step 1207, steps 1213 to 1219 are processed in this embodiment. At steps 1213 through 1219, the regenerating process similar to those at steps 809 through 815 are carried out, i.e., in this embodiment, even when the temperature of $NO_x$ absorbent is high ($THC \geq TH_0$), the regenerating process is carried out if the amount of the $NO_x$ accumulated in the $NO_x$ absorbent reaches a relatively large value ($CR \geq CR_1$).

On the other hand, if $THC < TH_0$ at step 1205, i.e., if the low temperature operation of the $NO_x$ absorbent is being carried out, then it is determined at step 1211 whether the temperature $THC_{i-1}$ of the $NO_x$ absorbent when the routine was last processed is higher than or equal to $TH_0$, i.e., it is determined whether the high temperature operation of the $NO_x$ absorbent was being carried out when the routine was last processed. If $THC_{i-1} \geq TH_0$ at step 1211, since this means that the present processing of the routine is the first processing after the high temperature operation is terminated, the routine processes steps 1213 through 1219 to perform the regenerating process. By these steps, the amount of the $NO_x$ accumulated in the $NO_x$ absorbent is lowered immediately after the high temperature operation of the $NO_x$ absorbent is terminated, and even if the high temperature operation of the $NO_x$ absorbent is resumed shortly, the $NO_x$ absorbent can start the absorbing operation of $NO_x$ with a small amount of $NO_x$ accumulated in the absorbent.

If $THC_{i-1} < TH_0$ at step 1211, i.e., if the low temperature operation of the $NO_x$ absorbent was being carried out also when the routine was last processed, the routine proceeds to step 1221 to determine whether the present amount CR of the $NO_x$ in the absorbent is larger than or equal to a second predetermined value $CR_1$. The value of $CR_2$ is set at smaller than the value of $CR_1$, and in this embodiment, $CR_2$ is set at, for example, about 10% of the amount of $NO_x$ when the $NO_x$ absorbent is saturated with $NO_x$. If $CR \geq CR_2$ at step 1221, then the regenerating process is carried out by steps 1213 to 1219, and if $CR \geq CR_2$ at step 1221, the regeneration flag XF is reset at 0 and the regenerating process is not carried out.

By these steps, the regenerating process of the $NO_x$ absorbent is performed when the amount CR of $NO_x$ in the absorbent reaches a relatively small value ($CR_2$) during the low temperature operation of the $NO_x$ absorbent. Therefore, the amount of the $NO_x$ accumulated in the $NO_x$ absorbent is always kept small during the low temperature operation of the $NO_x$ absorbent.

Figure 13A:
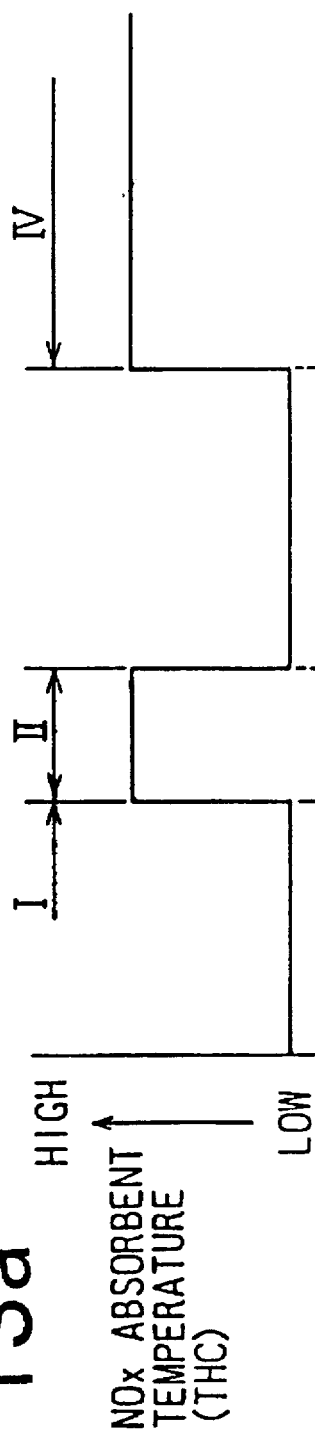
FIG. 13 is a timing diagram explaining the regenerating process of FIG. 12.
Figure 13B:
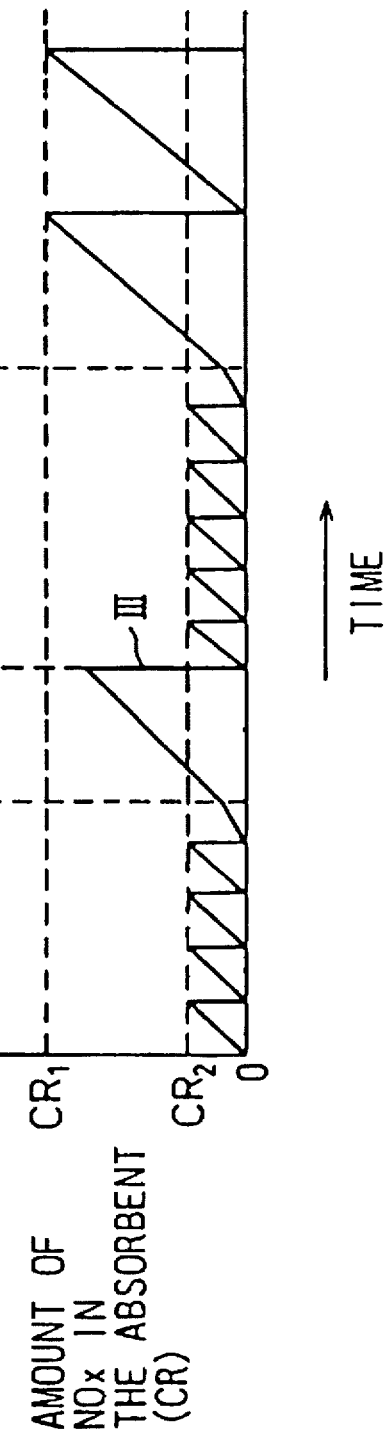

FIG. 13 is a timing diagram illustrating the regenerating process according to the flowchart in FIG. 12. The curve (a) in FIG. 13 represents the change in the temperature THC of the $NO_x$ absorbent, and the curve (b) in FIG. 13 represents the amount CR of the $NO_x$ accumulated in the $NO_x$ absorbent when the temperature of the $NO_x$ absorbent changes as shown by the curve (a). In this embodiment, when the temperature THC is low, the regenerating process of the $NO_x$ absorbent is repeated at short intervals every time when the amount CR of the $NO_x$ in the absorbent reaches a relatively small value $CR_2$, and the amount CR becomes almost 0 after every regenerating process (FIG. 13, period I). Therefore, during low temperature operation of the $NO_x$ absorbent, the amount CR of the $NO_x$ accumulated in the $NO_x$ absorbent is always kept lower than $CR_2$. When the temperature THC becomes high due to, for example, a change in the operating conditions of the engine, the regenerating process of the $NO_x$ absorbent is not performed until the amount CR reaches a relatively large value $CR_1$ (FIG. 13, period II). Further, as seen from FIG. 13, the amount CR of the $NO_x$ accumulated in the $NO_x$ absorbent is $CR_2$ at maximum when the high temperature operation starts. Therefore, the $NO_x$ absorbent is capable of absorbing the amount of $NO_x$ at least corresponding ($CR_1-C_2$) before the regenerating process is carried out during the high temperature operation. Thus, when the high temperature operation is relatively short as shown in FIG. 13, period II, the regenerating process is not carried out since the amount CR does not reach the value $CR_1$ during the high temperature operation, and the outflow of $NO_x$ at the beginning of the regenerating process at high temperature is prevented from occurring.

Further, when the temperature of the $NO_x$ absorbent becomes low after the high temperature operation, the regenerating process is carried out immediately in this embodiment (FIG. 13, portion III). Therefore, the amount CR is reduced to 0 as soon as the high temperature operation terminates, thereby the $NO_x$ absorbent resumes its maximum capability for absorbing $NO_x$. If the high temperature operation continues longer (FIG. 13, period IV), the regenerating process of the $NO_x$ absorbent is performed when the amount CR reaches a relatively large value $CR_1$. Therefore, even when the high temperature operation continues for a long time, the saturation of the $NO_x$ absorbent with $NO_x$ does not occur.

Figure 14:
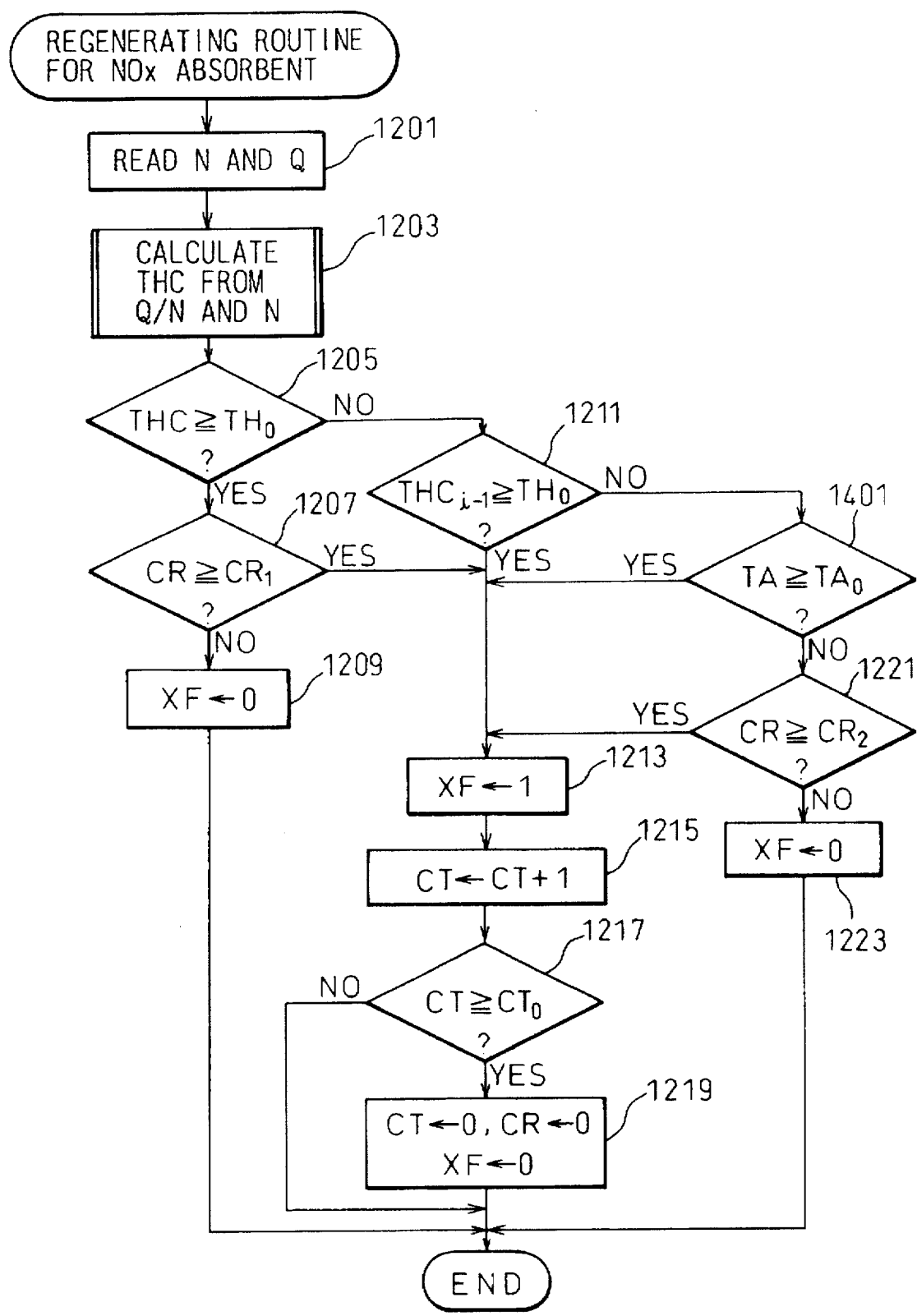
FIG. 14 is a flowchart explaining an embodiment of the regenerating process which is different from the embodiments in FIGS. 8 and 12.

FIG. 14 shows another embodiment of the flowchart of regenerating process of the $NO_x$ absorbent according to the present invention. The flowchart in FIG. 14 is identical to the flowchart in FIG. 12, except that step 1401 is added in FIG. 14 between steps 1211 and 1221.

Namely, in this embodiment, if the low temperature operation of the $NO_x$ absorbent continues from the time at which the routine was last processed (i.e., if $THC_{i-1} < TH_0$ at step 1211 in FIG. 14), then the routine determines at step 1401 whether the degree of opening TA of the throttle valve is larger than or equal to a predetermined value $TA_0$. If $TA \geq TA_0$ at step 1401, then the routine proceeds to step 1213 to perform the regenerating process regardless of the amount CR. On the other hand, if $TA < TA_0$ at step 1401, the routine proceeds to step 1221. In this case the regenerating process is carried out only when the amount CR reaches the value $CR_1$.

In this embodiment, the temperature of the $NO_x$ absorbent in the immediate future is estimated based on the change in the degree of opening TA of the throttle valve. Namely, since the degree of opening TA of the throttle valve represents the engine load, if the present value of TA is large (i.e., if the present engine load is high), the exhaust gas temperature (i.e., the temperature of the $NO_x$ absorbent) will rise in a short time even if the present temperature of the $NO_x$ absorbent is low. Therefore, in this embodiment, the regenerating process is performed regardless of the amount CR if the degree of opening TA of the throttle valve becomes larger than or equal to the value $TA_0$ to prepare for a possible high temperature operation by reducing the amount of the $NO_x$ accumulated in the $NO_x$ absorbent. Therefore, whenever the high temperature operation starts, the $NO_x$ absorbent in this embodiment can maintain a large capacity for absorbing $NO_x$ in the exhaust gas. Though the degree of opening TA of the throttle valve is used for estimating the temperature of the $NO_x$ absorbent in the future, other operating parameters of the engine, such as an intake manifold pressure, may be used for estimating the temperature of the $NO_x$ absorbent in the future.

As explained above, according to the present invention, the outflow of $NO_x$ at the beginning of the regenerating process of the $NO_x$ absorbent in the high temperature operation can be suppressed, to thereby minimize the emission of $NO_x$ to the atmosphere.

We claim:

1. An exhaust gas purification device for an internal combustion engine comprising:

a $NO_x$ absorbent disposed in an exhaust passage of an internal combustion engine, wherein the $NO_x$ absorbent absorbs $NO_x$ in exhaust gas from the engine when the air-fuel ratio of the exhaust gas flowing into the $NO_x$ absorbent is lean, and releases the absorbed $NO_x$ when the oxygen concentration in the exhaust gas becomes lower;

temperature detecting means for detecting a temperature of the $NO_x$ absorbent;

regenerating means for causing the air-fuel ratio of the exhaust gas flowing into the $NO_x$ absorbent to become one of a rich air-fuel ratio and a stoichiometric air-fuel ratio to cause the $NO_x$ accumulated in the $NO_x$ absorbent to be released from the $NO_x$ absorbent and to be reduced to nitrogen; and regeneration control means for activating the regenerating means to cause the air-fuel ratio of the exhaust gas flowing into the $NO_x$ absorbent to become one of a rich air-fuel ratio and a stoichiometric air-fuel ratio only when the temperature of the $NO_x$ absorbent is lower than a predetermined temperature and an amount of $NO_x$ accumulated in the $NO_x$ absorbent is at least a predetermined amount.

2. An exhaust gas purification device according to claim 1, wherein said regeneration control means prohibits the regenerating means from causing the air-fuel ratio of the exhaust gas to become rich or stoichiometric when the temperature of the $NO_x$ absorbent is higher than or equal to said predetermined temperature.

3. An exhaust gas purification device according to claim 1, wherein said regeneration control means comprises a temperature control means for keeping the temperature of the $NO_x$ absorbent at lower than said predetermined temperature at least when the regenerating means causes the air-fuel ratio of the exhaust gas flowing into the $NO_x$ absorbent to become rich or stoichiometric.

4. An exhaust gas purification device for an internal combustion engine comprising:

a $NO_x$ absorbent disposed in an exhaust passage of an internal combustion engine, wherein the $NO_x$ absorbent absorbs $NO_x$ in exhaust gas from the engine when the air-fuel ratio of the exhaust gas flowing into the $NO_x$ absorbent is lean, and releases the absorbed $NO_x$ when the oxygen concentration in the exhaust gas becomes lower;

regenerating means for causing the air-fuel ratio of the exhaust gas flowing into the $NO_x$ absorbent to become one of a rich air-fuel ratio and a stoichiometric air-fuel ratio to cause the $NO_x$ accumulated in the $NO_x$ absorbent to be released from the $NO_x$ absorbent and to be reduced to nitrogen;

activating means for activating the regenerating means when the amount of $NO_x$ accumulated in the $NO_x$ absorbent reaches a predetermined value;

temperature detecting means for detecting a temperature of the $NO_x$ absorbent; and regeneration timing control means for controlling the activating means in such a manner that the timing of the activation of the regenerating means is delayed as the temperature of the $NO_x$ absorbent increases.

5. An exhaust gas purification device according to claim 4, wherein said activating means comprises $NO_x$ amount detecting means for detecting the amount of the $NO_x$ accumulated in the $NO_x$ absorbent and activates the regenerating means when the amount of the $NO_x$ accumulated in the $NO_x$ absorbent becomes larger than a predetermined set value, and wherein said regeneration timing control means increases said set value as the temperature of the $NO_x$ absorbent becomes high.

\* \* \* \* \*

UNITED STATES PATENT AND TRADEMARK OFFICE
CERTIFICATE OF CORRECTION

PATENT NO. : 5,740,669
DATED : April 21, 1998
INVENTOR(S) : Yukio KINUGASA, et al.

It is certified that error appears in the above-identified patent and that said Letters Patent is hereby corrected as shown below:

ABSTRACT, line 15, change $NO_x$is" to --$NO_x$ is--.

Column 2, line 61, change "minimized" to --minimize--.

Column 6, line 1, change "$NO_3$" to --$NO_3^-$--.

Column 8, line 32, change "component" to --components--.

Column 14, line 47, change "are" to --is--.

Column 14, line 67, delete "10".

Column 15, line 20, change "are" to --is--.

Column 15, line 48, change "$CR_1$." to --$CR_2$.--.

Column 17, line 20, change "$NO_x$absorbent" to --$NO_x$ absorbent--.

UNITED STATES PATENT AND TRADEMARK OFFICE
CERTIFICATE OF CORRECTION

PATENT NO. : 5,740,669
DATED : April 21, 1998
INVENTOR(S) : Yukio KINUGASA, et al.

It is certified that error appears in the above-identified patent and that said Letters Patent is hereby corrected as shown below:

Column 17, line 46, change "to-become" to --to become--.

Signed and Sealed this

Tenth Day of November 1998

Attest:

BRUCE LEHMAN

*Attesting Officer*  *Commissioner of Patents and Trademarks*